United States Patent
Ahmed et al.

(10) Patent No.: US 7,912,931 B2
(45) Date of Patent: Mar. 22, 2011

(54) METHOD AND APPARATUS FOR INCREASING FAULT TOLERANCE FOR CROSS-LAYER COMMUNICATION IN NETWORKS

(75) Inventors: Mohiuddin Ahmed, Moorpark, CA (US); Son Dao, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1714 days.

(21) Appl. No.: 10/772,138

(22) Filed: Feb. 3, 2004

(65) Prior Publication Data

US 2005/0193226 A1    Sep. 1, 2005

Related U.S. Application Data

(60) Provisional application No. 60/444,746, filed on Feb. 3, 2003, provisional application No. 60/458,248, filed on Mar. 28, 2003.

(51) Int. Cl.
*G06F 15/173* (2006.01)
(52) U.S. Cl. .................. 709/223; 709/224
(58) Field of Classification Search .............. 709/238, 709/241, 223, 224
See application file for complete search history.

(56) References Cited

U.S. PATENT DOCUMENTS

| | | | |
|---|---|---|---|
| 6,335,927 B1 * | 1/2002 | Elliott et al. | 370/352 |
| 6,732,189 B1 * | 5/2004 | Novaes | 709/249 |
| 2001/0025351 A1 * | 9/2001 | Kursawe et al. | 714/4 |
| 2002/0107023 A1 * | 8/2002 | Chari et al. | 455/445 |
| 2002/0143888 A1 * | 10/2002 | Lisiecki et al. | 709/214 |

OTHER PUBLICATIONS

Corson et al., "Internet-Based Mobile Ad Hoc Networking", IEEE Internet Computing, Jul.-Aug. 1999, pp. 63-70.*
P. Bhagwat and C. Perkins. Highly dynamic destination-sequenced distance vector (DSDV) routing for mobile computers. ACM SIGCOMM, 1994.
K.P. Hatzis, et al. Fundamental control algorithms in mobile networks. In ACM Symposium on Parallel Algorithms and Architectures, pp. 251-260, 1999.
C. Intanagonwiwat, et al. The Sink-based Anycast Routing Protocol for Ad Hoc Wireless Sensor Networks. Technical Report 99-698, USC/Information Sciences Institute, 1999.
D.B. Johnson, et al. Dynamic source routing in ad hoc wireless networks. In Imielinski and Korth, editors, Mobile Computing, vol. 353. Kluwer Academic Publishers, 1996.
Y.Ko and N.H. Vaidya. Anycasting and geocasting in mobile ad hoc networks. Technical Report TR00-015, Department of Computer Sciences, Texas A & M University, 27, 2000.
N. Malpani, et al. Leader election algorithms for mobile ad hoc networks. In Proc. of the 4th Int'l W.on Disc. Alg. and Meth. for Mobile Comp. and Comm., pp. 96-103, Boston, MA, 2000.
E. Pagani and G.P. Rossi. Reliable broadcast in mobile multihop packet networks. In Mobile Computing and Networking, pp. 34-42, 1997.

(Continued)

*Primary Examiner* — Joon H Hwang
*Assistant Examiner* — Sherman Lin
(74) *Attorney, Agent, or Firm* — George R. Rapacki; Daniel R. Allemeier

(57) ABSTRACT

A method, apparatus, and computer program product are presented for providing a measure of fault tolerance and security in the operation of cross layer communication agents (CCA) in a hybrid network. Specifically, this method, apparatus and computer program provide the detection and control necessary to prevent network disruptions due to failures, attacks, or link unavailability.

65 Claims, 10 Drawing Sheets

OTHER PUBLICATIONS

V. Park and M. Corson. A highly adaptive distributed routing algorithm for mobile wireless networks. In IEEE INFOCOM, 1997.

J.Walter, et al. A mutual exclusion algorithm for ad hoc mobile networks. Tech. Report TR99-011, Department of Computer Sciences, Texas A & M University, 1999.

L. Zhou and Z. Hass. Securing ad hoc networks. IEEE Network Magazine, 13 (6), 1999.

University of Southern California, Information Systems Institute (USC-ISI), ns-2 Network Simulator, http://www.isi.usc.edu/nsnam/ns.

L.Lamport, R. Shostak and M. Pease. The Byzantine Generals Problem. ACM Transactions on Programming, Language, and System, 4(3), Jul. 1982, pp. 382-401.

* cited by examiner

METHOD AND APPARATUS FOR INCREASING FAULT TOLERANCE FOR CROSS-LAYER COMMUNICATION IN NETWORKS

PRIORITY CLAIM

This application claims the benefit of priority to provisional patent applications 60/444,746, filed Feb. 3, 2003, with the U.S. Patent and Trademark Office, and titled "Distributed Fault Tolerance Techniques for Cross Layer Communication Agents in Hybrid Mobile Wireless Networks," and 60/458,248, filed Mar. 28, 2003, with the U.S. Patent and Trademark Office, and titled "Method and Apparatus for increasing fault tolerance for Cross-layer Communication in networks."

STATEMENT OF GOVERNMENTAL INTEREST

This invention is related to work preformed in contract with the U.S. Government under the Office of Navel Research Contract #N00014-99-C-0322, and the U.S. Government may have certain rights in this invention.

BACKGROUND OF THE INVENTION (1) Technical Field

The present invention relates to techniques for security and fault tolerance in hybrid networks. Specifically, the invention relates to a system and method to allow and utilize multiple Cross Layer Communication Agents in a single sub-network for increased fault tolerance.

(2) Discussion

Over the past several decades, the electronic communications field, particularly in the area of wireless communication, has exploded. Wireless communication is no longer limited to terrestrial networks, such as cellular networks; instead, the field has expanded to include hybrid networks such as satellite networks combined with fixed and mobile multi-hop terrestrial networks. FIG. 1 depicts a hybrid network 100 comprising different components such as ad-hoc sub-networks 102, 104 and low earth orbiting (LEO) or geo-stationary earth orbiting (GEO) satellites 106.

In order to enable connectivity between the disparate components, cross layer communication agents (CCAs) 108-1, 108-2 are used. CCAs 108-1, 108-2 serve as gateways capable of interfacing with the various hybrid components of the hybrid network 100. Typically hybrid networks comprise different network types such as satellite networks, fixed, and mobile networks all interconnected though a variety of CCAs. The CCAs can switch packets between different networks and thus enable communication between the different components.

The concept of CCAs becomes even more complicated when applied to an ad-hoc network. An ad-hoc network comprises many mobile nodes that communicate using transceivers capable of transmitting or receiving short-range signals. Some of these mobile nodes function as CCAs since they are equipped with communication equipment capable of transmitting to other realms, such as satellite transmitters/receivers. Therefore, all communication from the ad-hoc network to the other components within the heterogeneous network 100 has to be routed through the CCA nodes 108-1, 108-2. For example, if a node 102-1 in an ad-hoc network 102 wishes to send data to a node 104-1 in another ad-hoc network 104 that is a part of the heterogeneous network 100, node 102-1 has to first route the data packets to a CCA 108-1. The CCA 108-1 will then forward the data packets to a satellite 106 which will forward the packets to a CCA 108-2 in the destination ad-hoc network 104, which forwards the packets to the destination node 104-1. However, for this chain of events to execute successfully, each node 102-1, 104-1 in the heterogeneous network 100 needs to be configured with the information for identifying its affiliated CCA 108. If only a single CCA 108 is present in each ad-hoc network 102, 104, then the job of configuring each node 102-1, 104-1 with CCA information is not difficult. Just as in a wired local area network (LAN), the mobile nodes can be configured either manually or during IP address assignment using dynamic host configuration protocol (DHCP).

From a fault tolerance point of view, the foregoing network architecture, where there is only one CCA, presents a problem. If the one CCA fails, then the entire ad-hoc network associated with that CCA will be disconnected from the heterogeneous network 100. To reduce the potential for complete disconnection of an ad-hoc network due to a failure of a single component, it is desirable that each ad-hoc network have multiple, redundant CCAs. Furthermore, all CCAs may not be able to communicate with LEO satellites at all times for various reasons, such as terrain blockages, buffer overflows, etc. In these cases, it is desirable to have at least one other CCA-capable node to take over the responsibility of being the gateway CCA for the group. However to facilitate CCA redundancy, a need exists to coordinate the relay of data to these multiple CCA-capable nodes within a single ad-hoc network. First, communication is necessary to determine which CCA-capable node is going to be the gateway. Second, all other nodes in the ad-hoc network need to be informed which CCA-capable node is the current gateway CCA. So when one CCA-capable node takes over the responsibility of being the gateway CCA for the group, the mobile nodes within its purview need to be informed to route their inter-domain packets to the new gateway CCA. However, standard Internet inter-domain routing protocols, such as border gateway protocol (BGP) are not useful in these cases because of the high frequency of changes that occur in ad-hoc networks. Thus, what is needed is a system and method for configuring the mobile nodes with the gateway CCA information in the face of different types of faults that can occur within the ad-hoc network. Typically these faults include, (i) Fail-Stop: This happens when a gateway CCA is destroyed or otherwise incapacitated; (ii) Intermittent: This can occur when a gateway CCA is disabled temporarily because of terrain blockages, etc.; and (iii) Byzantine: This happens when a gateway CCA is confiscated and is being manipulated by an unknown entity (i.e. a hacker or some other enemy).

(3) Related Work

Several routing protocols, e.g., dynamic source routing (DSR), destination-sequenced distance vector (DSDV) and temporally ordered routing algorithm (TORA), have been proposed for ad-hoc networks. Almost all of these algorithms are for routing within the ad-hoc network only. They do not extend to heterogeneous networks containing a mix of both ad-hoc components and infrastructure-based networks. As previously discussed, the ad-hoc network preferably has multiple CCA-capable nodes present within the ad-hoc sub-network that are capable of routing packets between the ad-hoc sub-network and the other networks comprising the heterogeneous network, i.e. fixed, satellite or airborne networks. Anycasting is a possible solution, where all the CCA-capable nodes can be grouped into a single anycast address and mobile nodes can use this address as the router for communicating with hosts not in their ad-hoc sub-network. But not all routing protocols support such anycast mechanisms. In Y. Kao and N. H. Vaiday, Anycasting and Geo-casting in Mobile Ad-hoc Networks, Technical Report TR00-014, Department of Computer Sciences, Texas A&M University, 27, 2000, Vaiday et al. propose extensions to TORA to support anycasting. Further, in C. Intanagonwiwat and D. D. Lucia, The Sink-based Anycast Routing Protocol for Ad-hoc Wireless Sensor Networks, Technical Report 99-698, USC/Information Sciences Institute, 1990, a sink-based anycast routing protocol is proposed.

There has been little research in the area of security and fault tolerance for ad-hoc networks. In L. Zhou and Z. Hass, Securing Ad-hoc Networks, IEEE Network Magazine, 13(6), 1999, security-related issues involving routing in ad-hoc networks are discussed. The Hass et al. article proposes that ad-hoc networks should have a distributed architecture with no central entities to achieve high survivability. They propose to use (n, t+1) threshold cryptographic methods to decentralize any cryptographic operation (e.g., signing a key), where at least t+1 nodes have to collaborate to perform the operation and no set of t nodes can achieve the same result, even operating in collusion.

Any fault-tolerant algorithm inherently has to be distributed. The complexity of such algorithms in ad-hoc networks is increased due to the highly dynamic nature of such networks and the unreliability of the communication medium. In K. P. Hatzis, G. P. Pentaris, P. G. Spirakis, V. T. Tampakas, and R. B. Tan, Fundamental Control Algorithms in Mobile Networks, ACM Symposium on Parallel Algorithms and Architectures, p. 251-260, 1999, the authors propose two distributed leader election algorithms for ad-hoc networks. Their algorithms require that all nodes know the coordinates of the space in advance. In N. Malpani, J. L. Welch, and N. Vaida, Leader Election Algorithms for Mobile Ad-hoc Networks, Proceedings of the 4$^{th}$ International Workshop on Discrete Algorithms and Methods for Mobile Computing and Communications, p. 96-103, Boston, Mass., August 2000, the authors propose distributed leader election algorithms that are based on TORA. However, both of these works consider only the dynamic and multi-hop nature of the mobile ad-hoc network and assume that the communication medium is reliable and that the nodes are 'well-behaved.'

Other distributed problems solved for mobile ad-hoc networks are mutual exclusion in J. Walter, J. Welch, and N. H. Vaida, A Mutual Exclusion Algorithm for Ad-hoc Mobile Networks, Technical Report TR99-011, Department of Computer Sciences, Texas A&M University, 1999 and reliable broadcast in E. Pagani and G. P. Rossi, Reliable Broadcast in Mobile Multi-hop Packet Networks, Mobile Computing and Networking, pg. 34-42, 1997. None of these works deals with the case of misbehaving nodes.

SUMMARY OF THE INVENTION

The present invention provides a method, an apparatus, and a computer program product for increasing the fault tolerance in a network. In a first aspect, operations of the present invention comprise: associating a plurality of nodes with a sub-network, each of said plurality of nodes capable of sending and receiving data; adding a plurality of cross layer communication agent capable nodes, herein referred to as CCA-capable nodes, to said sub-network, said plurality of CCA-capable nodes capable of receiving data from and sending data to said plurality of nodes; and determining which CCA-capable node should be assigned to be a gateway CCA, whereby said gateway CCA is used by each one of said plurality of nodes within said sub-network to communicate with the rest of the network.

In another aspect of the present invention, the operation of determining further comprises designating one of the plurality of CCA-capable nodes as the gateway CCA; querying the gateway CCA from each node to determine whether it is active and awaiting a response, and when: the gateway CCA responds, repeating the querying operation; otherwise, broadcasting a solicit message for receipt by CCA-capable nodes and awaiting a response, and when: a CCA-capable node responds, assigning a CCA-capable node as the gateway CCA; otherwise, repeating the broadcasting operation.

In another aspect of the present invention, when a plurality of CCA-capable nodes responds, selecting, among the nodes, a single CCA-capable node for use by all of the nodes as the gateway CCA.

In another aspect of the present invention, the operation of selecting further comprises operations of: determining a network ID for each of the plurality of CCA-capable nodes responding; and selecting a CCA-capable node having a lowest network ID from each of the plurality of CCA-capable nodes responding as the gateway CCA.

In another aspect of the present invention, the operation of determining which CCA-capable node should be assigned to be the gateway CCA further comprises designating one of the plurality of CCA-capable nodes to be a gateway CCA; querying the plurality of CCA-capable nodes, from at least one node of the plurality of nodes, to determine whether they are active and awaiting a response, and when: the gateway CCA responds, repeating the querying operation; otherwise, changing the CCA-capable node assigned to be the gateway CCA based upon a response from the plurality of CCA-capable nodes.

In another aspect of the present invention, when more than one CCA-capable node responds, selecting, among the nodes, a single CCA-capable node for use by all of the nodes as the gateway CCA.

In another aspect of the present invention, the operation of determining which CCA-capable node should be assigned to be the gateway CCA further comprises designating one of the plurality of CCA-capable nodes to be a gateway CCA; compiling a list of CCA-capable nodes on at least one CCA-capable node of the plurality of CCA-capable nodes; querying each CCA-capable node, from the at least one CCA-capable node, in the list to determine its state; updating the list of CCA-capable nodes based on the responses from the CCA-capable nodes; and checking for a response from the gateway, and when: the gateway CCA responds repeating the querying operation; otherwise, transmitting the list of CCA-capable nodes to the plurality of nodes in the sub-network; and selecting and assigning a new gateway CCA from the list of CCA-capable nodes.

In another aspect of the present invention, when more than one CCA-capable node is in the list of CCA-capable nodes, selecting, among the nodes, a single CCA-capable node for use by all of the nodes as the gateway CCA.

In another aspect of the present invention, the operation of determining which CCA-capable node should be assigned to be the gateway CCA further comprises designating one of the plurality of CCA-capable nodes to be a gateway CCA; querying each CCA-capable node, from at least one CCA-capable node in the plurality of CCA-capable nodes, in the list to determine its state; updating the list of CCA-capable nodes based on the responses from the CCA-capable nodes; sending, from the at least one CCA-capable node, the list of CCA-capable nodes to the plurality of nodes in the sub-network; waiting to repeat the querying operation; and checking, by at least one of the nodes in the plurality of nodes, the list of CCA-capable nodes for the gateway CCA, and when:

the gateway CCA is in the list of CCA-capable nodes waiting for the next list of CCA-capable nodes; otherwise, selecting and assigning a new gateway CCA from the list of CCA-capable nodes.

In another aspect of the present invention, when more than one CCA-capable node is in the list of CCA-capable nodes, selecting, among the nodes, a single CCA-capable node for use by all of the nodes as the gateway CCA.

In another aspect of the present invention, the operation of determining which CCA-capable node should be assigned to be the gateway CCA further comprises designating one of the plurality of CCA-capable nodes to be a gateway CCA; broadcasting a message from each CCA-capable node to the plurality of nodes; and selecting a gateway CCA based upon the message from each CCA-capable node.

In another aspect of the present invention, the operation of selecting a gateway CCA further comprises the operations of determining a current hop-count for the message; and comparing the current hop-count to previous hop-counts from previous messages, and when the current hop-count is less than the previous hop-count selecting the CCA-capable node which broadcast the message as a new gateway CCA.

In another aspect of the present invention, the operation of selecting a gateway CCA further comprises the operations of determining a current time at which the message was received; retrieving a gateway time at which a message from the gateway CCA was received; and selecting and assigning a new gateway CCA based upon a result of a user-specified formula for comparing the current time and the gateway time.

In another aspect of the present invention, the operation of determining which CCA-capable node should be assigned to be the gateway CCA further comprises the operations of designating one of the plurality of CCA-capable nodes to be a gateway CCA; transmitting a vote from each CCA-capable node to all other CCA-capable nodes designating which CCA-capable node should become a subsequent gateway CCA; and tallying said votes for each CCA-capable node, and when: one CCA-capable node receives more votes than any of the other CCA-capable nodes, assigning the one CCA-capable node to become the new gateway CCA, otherwise repeating the transmitting operation.

In another aspect of the present invention, the operation of determining which CCA-capable node should be assigned to be the gateway CCA further comprises the operation of determining if at least ⅔ of the plurality of CCA-capable nodes are active, and wherein at least ⅔ of the CCA-capable nodes must respond before performing the operation of transmitting the vote.

In another aspect of the present invention, the operation of associating the plurality of nodes further comprises an operation of associating the plurality of nodes in an ad-hoc manner.

In another aspect of the present invention, the method, apparatus, and computer program product further comprise the operation of enabling the plurality of nodes and CCA-capable nodes to be mobile.

One skilled in the art will appreciate that the operations presented above can be interpreted as computer instructions, an apparatus configured to perform the operations, or as processing acts of a method.

BRIEF DESCRIPTION OF THE DRAWINGS

The objects, features and advantages of the present invention will be apparent from the following detailed descriptions of the preferred aspect of the invention in conjunction with reference to the following drawings where.

DETAILED DESCRIPTION

Figure 1:
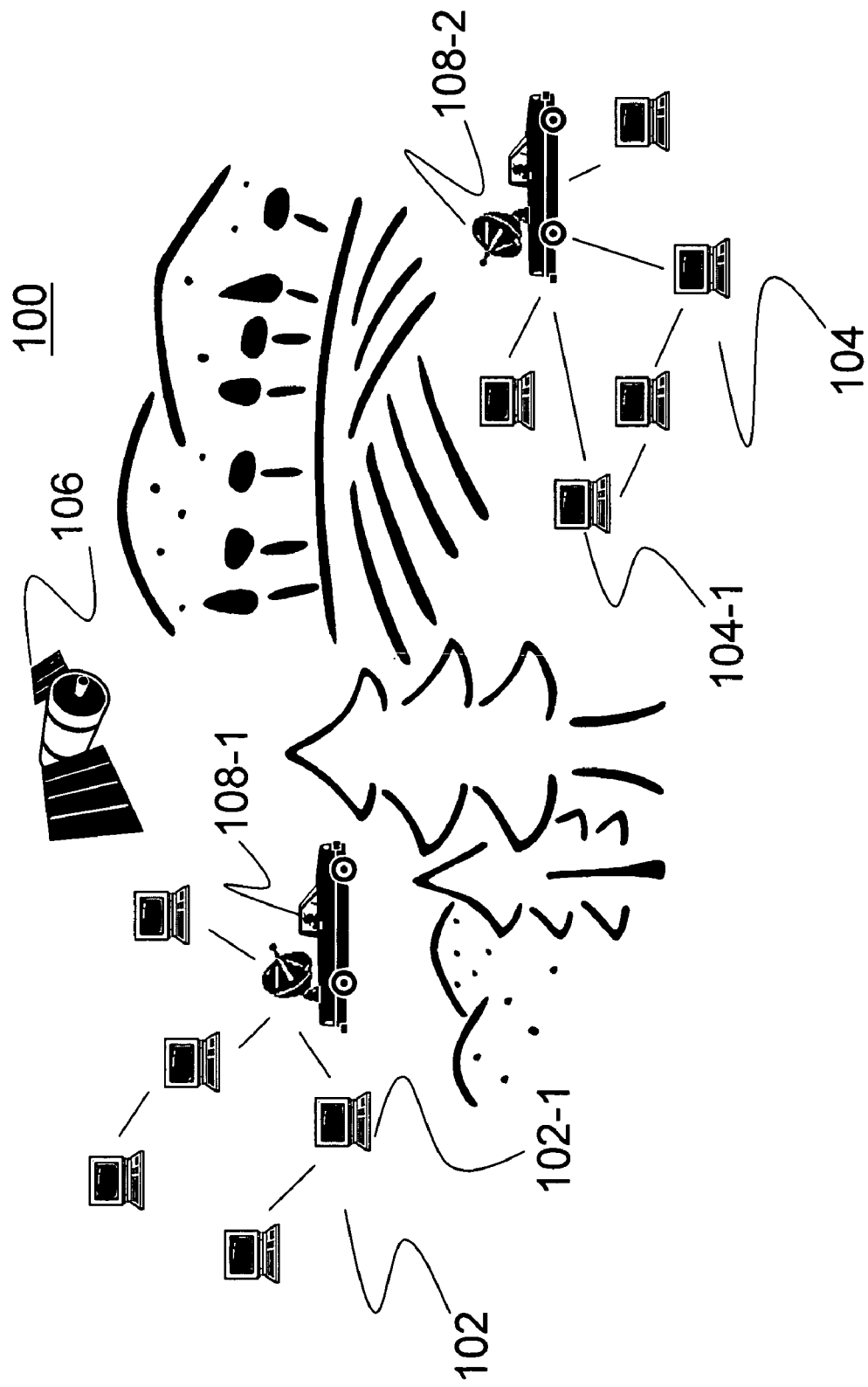
FIG. 1 is a prior art block diagram of a hybrid network.

The present invention relates to techniques for security and fault tolerance in hybrid wireless networks. Specifically, the invention relates to a system and method to allow and utilize multiple Cross Layer Communication Agents in a single sub-network for increased fault tolerance. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various principal aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

CCA-capable nodes—Cross-layer communication agent capable nodes are nodes capable as serving as gateways for interfacing between the various components of the hybrid network, or for interfacing between two sub-networks.

Hybrid network—A network comprising different components (heterogeneous) utilizing different transmission/reception equipment and/or protocols such as satellite networks combined with fixed and mobile multi-hop terrestrial networks.

Nodes—Network components capable of transmitting and receiving data to and from each other within a sub-network.

Sub-network—A sub-network comprises a collection of components that utilize the same (homogeneous) transmission/reception equipment to communicate with each other. A sub-network is a smaller portion of a larger hybrid network.

(2) Principal Aspects

The present invention has three principal aspects. The first is a node or sub-network of nodes. The sub-network includes a plurality of nodes and CCA-capable nodes. Running on the CCA-capable nodes and non-CCA-capable nodes are instructions, typically in the form of software operating on a computer system or in the form of a "hard-coded" instruction set. The second principal aspect is a method, typically in the form of software, operated using a data processing system (computer). The third principal aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

Figure 2:
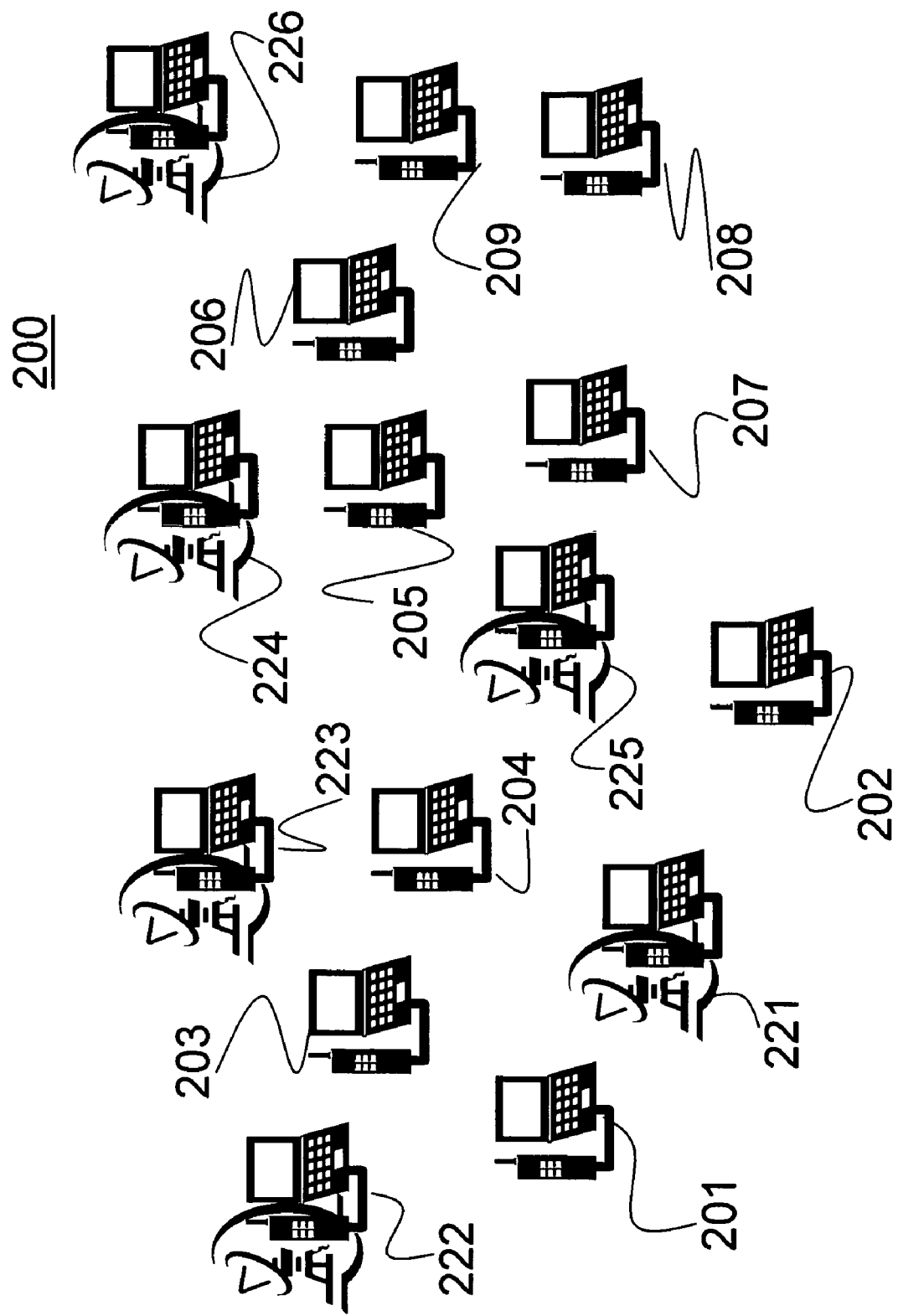
FIG. 2 is a block diagram depicting components in a sub-network in accordance with the present invention.

A block diagram depicting the components of a sub-network of the present invention is provided in FIG. 2, where icons are used for clarity and are not intended to limit the type of nodes or CCA-capable nodes. The sub-network 200 comprises a plurality of nodes 201-209 and a plurality of CCA-capable nodes 221-226. Each CCA-capable node 221-226 is equipped to provide a gateway for each of the plurality of nodes 201-209 to access other portions of the hybrid network, as discussed in relation to FIG. 1. One skilled in the art will appreciate that each CCA-capable node 221-226 may also be a node for communicating with the other nodes 201-209 in the sub-network 200.

Figure 3:
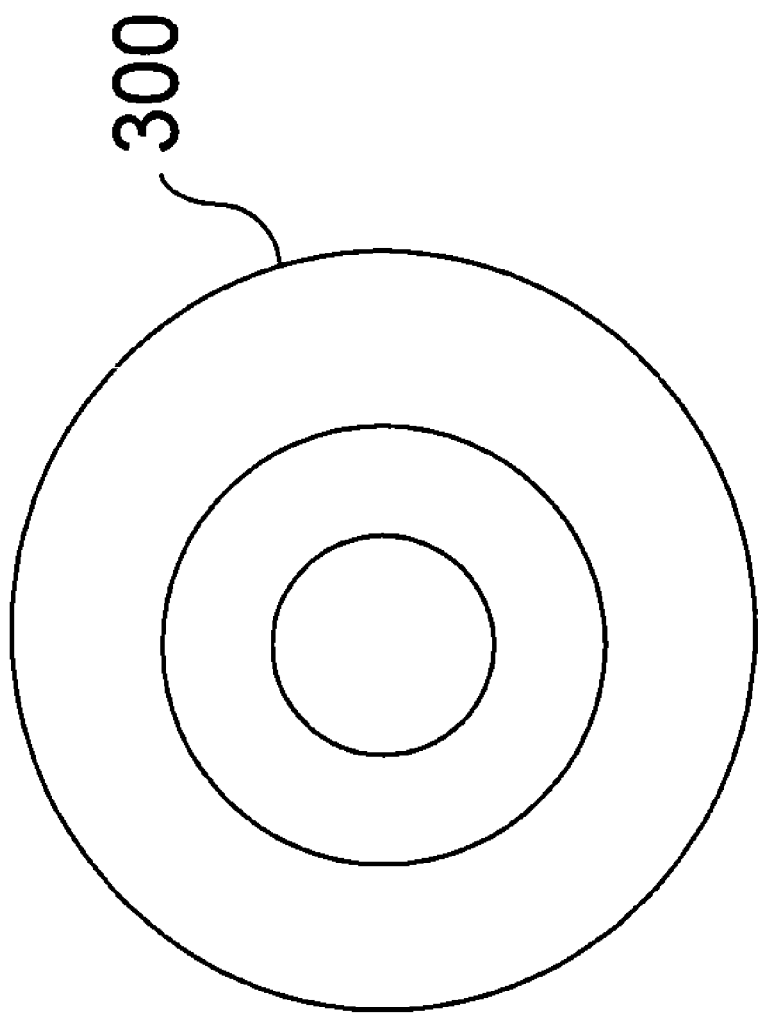
FIG. 3 is an illustrative diagram of a computer program product aspect of the present invention.

An illustrative diagram of a computer program product aspect of the present invention is depicted in FIG. 3. The computer program product 300 is depicted as an optical disk such as a CD or DVD. However, as mentioned previously, the computer program product generally represents computer readable code stored on any desirable computer readable medium.

Figure 4:
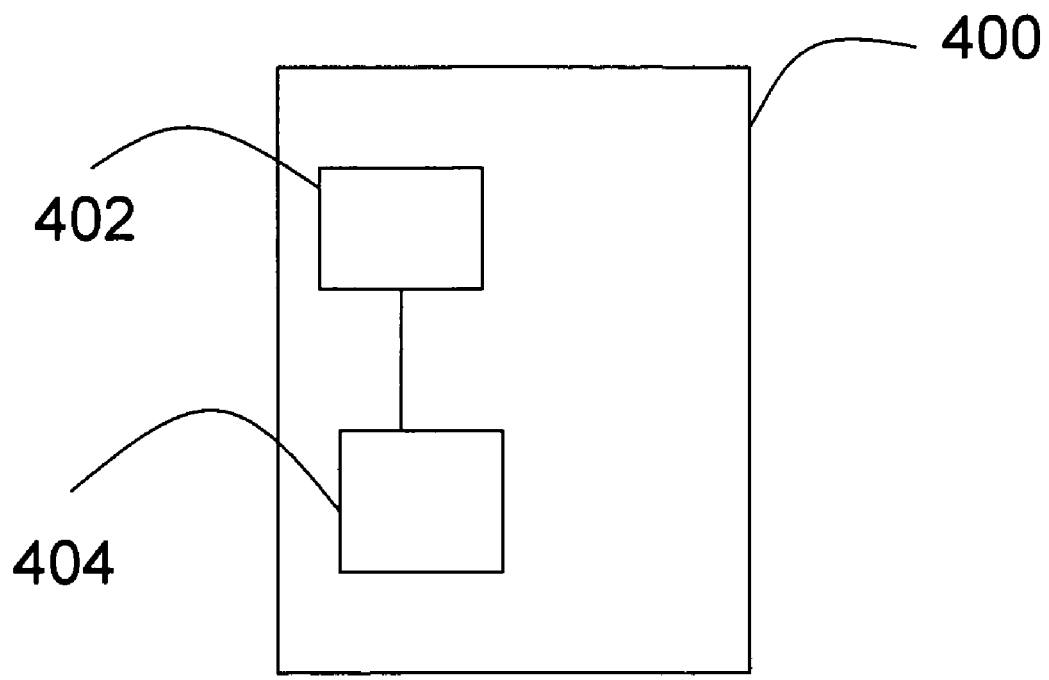
FIG. 4 is an illustrative diagram of a node in accordance with the present invention.

An illustrative diagram of a node is depicted in FIG. 4. As shown, the node 400 includes a data processing system 402 and a signal transmitter/receiver 404 coupled therewith. The signal transmitter/receiver 404 may be an omni-directional transmitter/receiver, or may be configured directionally if desired. While the transmitter/receiver 404 is shown in FIG. 2 to be RF, many other mediums such as millimeter wave (MMW), infra-red (IR), acoustic, etc. may be used.

Figure 5:
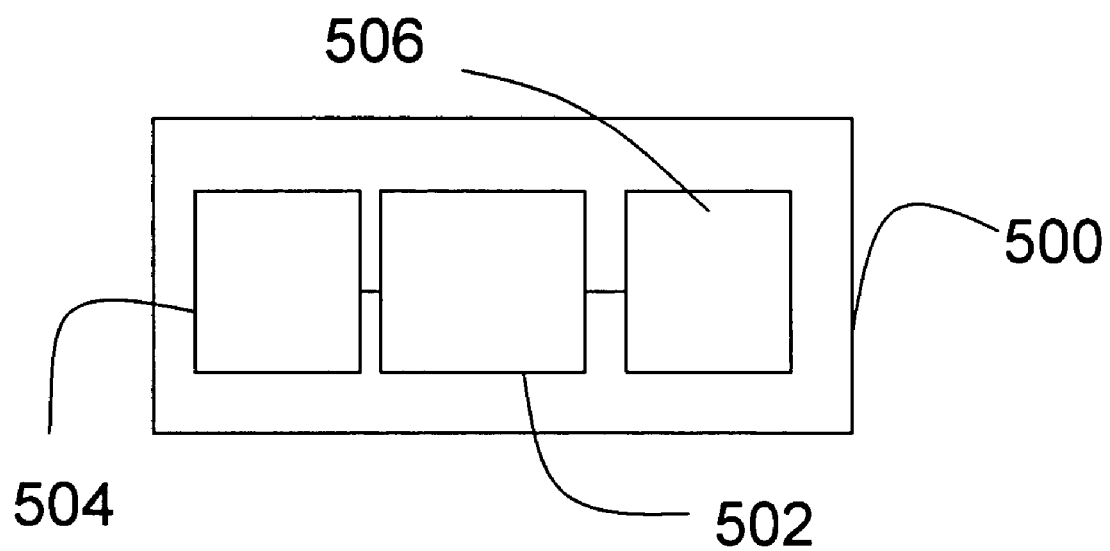
FIG. 5 is an illustrative diagram of a Cross Layer Communication Agent capable (CCA-capable) node in accordance with the present invention.

An illustrative diagram of a CCA-capable node is depicted in FIG. 5. As shown, the node 500 includes a data processing system 502 coupled with both a signal transmitter/receiver 504 and a cross-layer transmitter/receiver 506. The signal transmitter/receiver 504 maybe an omni directional transmitter/receiver, or may be configured directionally if desired. The cross-layer transmitter/receiver 506 is depicted in FIG. 2 as a satellite transmitter/receiver, but one skilled in the art will appreciate that the cross-layer transmitter/receiver 506 could be any type of transmitter/receiver required to communicatively connect the CCA-capable node 500 with the other components of the hybrid network whether it be a satellite network, a fixed network, an airborne network, or any other type of network. Further, one skilled in the art will appreciate that the signal transmitter/receiver 504 and the cross-layer transmitter/receiver 506 may be the same physical transmitter/receiver depending upon the configuration of the sub-network and the hybrid network.

In the illustration, the hybrid network is a satellite network and an ad-hoc wireless network. One skilled in the art will appreciate that the functions of transmitting and receiving signals from the hybrid network to the CCA-capable nodes may be split between two CCA-capable nodes, wherein one CCA-capable node transmits to the hybrid network, while a second CCA-capable node receives from the hybrid network. This implementation would require messaging between the CCA-capable nodes being used as transmitter and receiver.

(3) Introduction

The present invention provides a mechanism by which many CCA-capable nodes within a sub-network can take turns being the primary gateway, providing cross-layer connectivity, and thus ensuing fault tolerance in case of gateway CCA failures. For the hybrid network architecture described thus far, it is evident that a single gateway CCA in the sub-network is a single point of failure. The solution proposed comprises a plurality of CCA-capable nodes that otherwise function as regular nodes in the sub-network. At pseudo-random times, the responsibility of being the gateway is rotated among the CCA-capable nodes in an authenticated and distributed manner. This provides a measure of security against hostile attacks on the system that may compromise the connectivity or data integrity of the network. Thus, a few of the capabilities of a network of the present invention include:

Ability to detect failures among CCA-capable nodes and to coordinate the selection and initiation of backup gateway CCAs;

Ability to randomly and securely rotate the responsibility of being a gateway CCA among a group of CCA-capable nodes; and Ability to implement a secure and distributed fault tolerance system by designing the relevant network control features such as routing and medium access control messages.

One aspect of the present invention is to provide fault tolerance and security in the operation of CCA-capable nodes in a hybrid network, such as a satellite, mobile multi-hop network. The techniques employed also enable the network to be self-recovering and to have a graceful degradation in network performance in the face of failures; either unintentional or malicious.

The system and method comprises of a group of protocols that enable Cross Layer Communication Agents (CCAs) to incorporate a measure of security and distributed fault tolerance during normal operations. The subject matter is explained through the illustration of a wireless, ad-hoc, hybrid network consisting of satellites and mobile nodes. For purposes of this example and clarity of explanation, it is assumed that the nodes are clustered into sub-network groups, and the objective is to enable reliable, secure communications among the various nodes. As previously discussed, CCA nodes serve to extend the range and connectivity of the sub-network of mobile nodes.

(4) Assumptions

The fault tolerance algorithms disclosed herein are primarily designed to be implemented as software protocols on computing devices operating as part of a hybrid network, as shown in FIGS. 1 and 2. One skilled in the art will appreciate that these algorithms may also be implemented in firmware or hardware. The algorithms rely on underlying and overlying systems and software modules for complete system operation. The following assumptions will assist the reader in understanding the context under which these algorithms are preferably used.

First—The fault tolerance algorithms are network programs residing at the network layer and/or transport layer of the 7 layer Open Source Initiative (OSI) model. The algorithms preferably interact with the routing protocol to direct the formation/destruction of routes within the ad-hoc sub-network.

Second—The network employs standard medium access control (MAC), Routing or Physical Layer protocols.

Third—The network may have application-level or packet-level encryption/data authentication, but strong encryption and mutual authentication is preferable for passing the control messages among the CCA-capable nodes executing the fault-tolerance algorithms. This is to prevent Byzantine attacks from unauthorized nodes.

Fourth—During initial deployment, all the CCA-capable nodes in an ad-hoc sub-network are aware of each other's identity (e.g. authentication public key, network address etc.).

Fifth—During normal operations, only one CCA-capable node per ad-hoc sub-network is active, thus serving as a gateway CCA for that sub-network. A backup gateway CCA is activated from the group of CCA-capable nodes in response to failures or for security/alteration reasons. There is no system architectural limitation that prevents multiple gateway CCAs from operating simultaneously. One skilled in the art will appreciate that having multiple CCAs operating simultaneously increases the overhead (e.g. in handoff, tracking, power conservation etc. for the mobile nodes in the group).

Sixth—During initialization and boot-up, the CCA-capable node with the lowest network ID assumes the task of being the gateway CCA and floods the network with its identification information. Standard underlying protocols are used to ensure authentication (e.g., by digital signatures, etc.) for the other nodes in the network.

Seventh—Since CCA-capable nodes are expected to be GPS-enabled, a common synchronization clock is assumed to be available to all the CCA-capable nodes for reconciling time-out clocks and timers for the distributed algorithms.

The system and method disclosed herein can be applied to any hybrid network, including a satellite/mobile ad-hoc hybrid network that is deployed in a terrain with blockages and communication impairments (e.g., applications involving physically separated groups communicating with mobile CCA-capable nodes in harsh fading/jammed communication environments with blockages and high failure hazards). Other applications are also possible in industrial settings where mobile sensors or systems are needed to monitor or control a distributed process (e.g., physical packages being automatically routed and delivered, raw materials being handled remotely in the process line-up of a manufacturing plant, etc.) or for security applications, and situations where the information from the mobile robotic sensors is aggregated at a single concentrator node or gateway.

(5) Discussion

As previously described, the techniques disclosed herein enable recovery from the failure of a sub-network gateway CCA when connected with a larger hybrid network. Further, the techniques described herein provide for a more secure network. First, techniques for enabling recovery from failure will be discussed, followed by techniques that can be used to enhance the security in addition to recovering from failures.

I. Recovery from Failures

Failures of a gateway CCA include both (i) fail-stop failures, and (ii) intermittent failures. In fail-stop failures, the number of CCA-capable nodes that are available in a sub-network is permanently reduced (e.g., through destruction or power/operational outage). In contrast, for intermittent failures, CCA-capable nodes are temporarily disabled as these nodes experience intermittent connectivity (e.g., terrain) blockages. However, in the case of intermittent failures, the total number of simple nodes (non-CCA-capable nodes) is increased since the CCA-capable nodes may also operate as simple nodes.

There are several solutions for these failures. The solutions have been broadly divided into two categories for clarity: (1) node-initiated and (2) CCA-initiated. The solutions for each category can be further sub-divided into two groups: (a) reactive and (b) proactive. Thus, there are four possible combinations of solutions, and the algorithms corresponding to these solutions are outlined in general flowchart form in FIGS. 6-9. The algorithms themselves are described below. For estimating the numerical order for the control messages generated for each strategy, a network consisting of m nodes and n CCA-capable nodes per ad-hoc sub-network is assumed. Herein the term "nodes" refers both to nodes that are not CCA-capable and to CCA-capable nodes that are operating as non-CCA-capable nodes.

(a) Node-Initiated and Reactive

Figure 6:
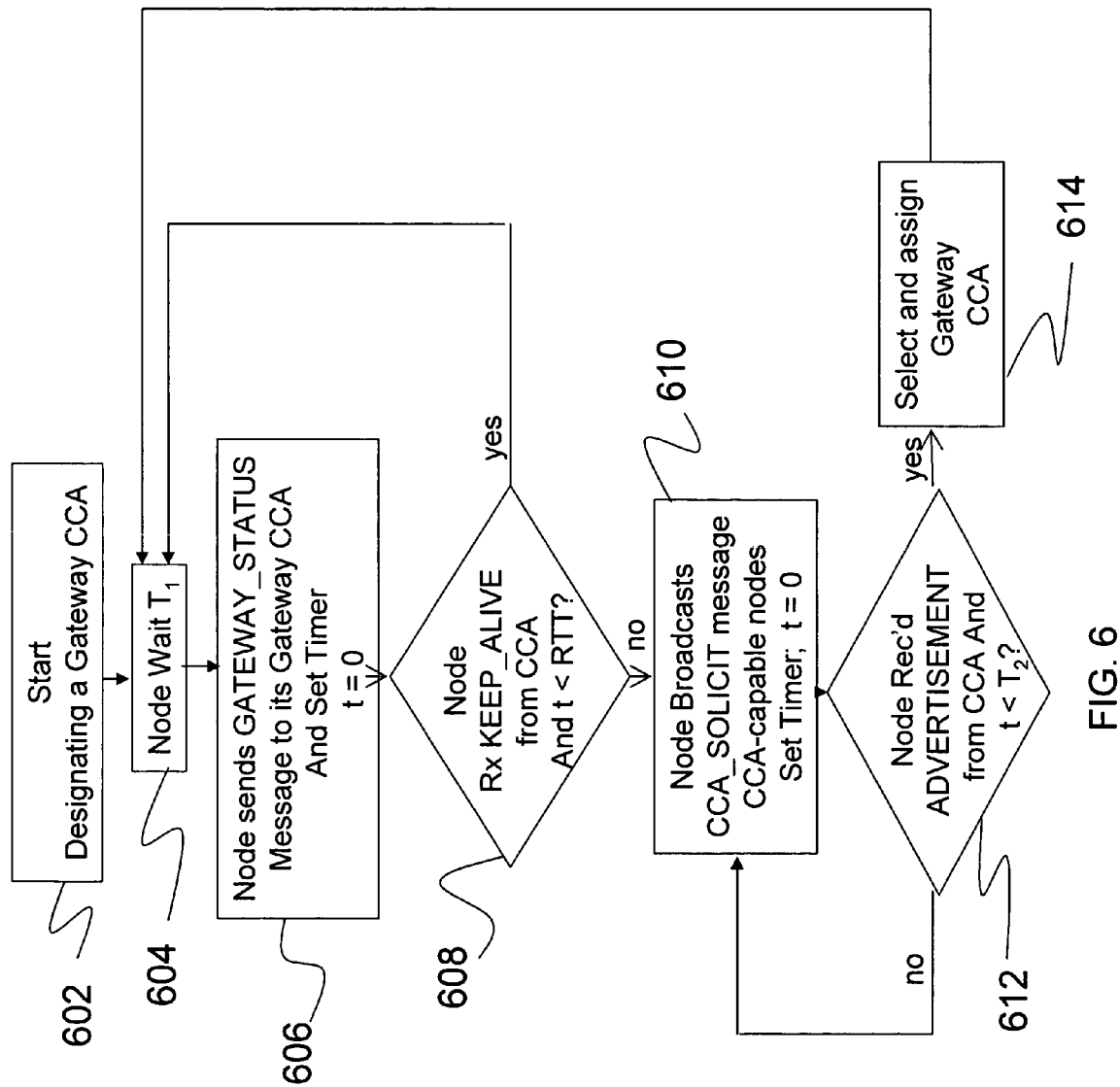
FIG. 6 is a flow diagram of the node-initiated and reactive algorithm in accordance with the present invention.

FIG. 6 is a flow diagram of the node-initiated and reactive algorithm. As previously discussed in section 4 entitled Assumptions, the CCA-capable node having the lowest network ID is initially assigned as the gateway CCA. In reference to FIG. 2 and FIG. 6, an action of designating a gateway CCA 602 is preformed in which a CCA-capable node 221 is assigned as the gateway CCA. In the node-initiated and reactive case, each node 201-209, 222-226 starts a search for a new gateway CCA when it finds its current gateway CCA 221 to be inactive. Each node 201-209, 222-226 periodically queries the 'liveness' status of its gateway CCA 221 (which indicates if the CCA is functional), by pinging the gateway CCA 221 after the action of waiting a time $T_1$ 604. Time $T_1$ is chosen based upon the needs of a particular application. For example, if the sub-network 200 is time critical, $T_1$ may be a small number on the order of milliseconds to ensure that any failure in the gateway CCA 221 will be quickly determined. However, if the sub-network is less important, $T_1$ may be chosen to be a longer duration. Another consideration for determining $T_1$ is the speed at which the nodes 201-209, 222-226 are traveling.

Each node 201-209, 222-226 performs an action of querying the gateway CCA 606, in which each node 201-209, 222-226 sends a GATEWAY_STATUS query message 606 to its gateway CCA 221, and sets its timer $T_1$ equal to zero. The node 201-209, 222-226 then performs an action of waiting for a KEEP_ALIVE message 608, wherein the node 201-209, 222-226 expects the gateway CCA 221 to respond with a KEEP_ALIVE message within a desired retransmission time-out (RTT) amount of time 608. If no such response is received, the node 201-209, 222-226 performs an action of broadcasting a CCA_SOLICIT message 610 wherein the node 201-209, 222-226 transmits the CCA_SOLICIT. The node 201-209, 222-226 then performs the action of waiting for an ADVERTISEMENT message 612, wherein the node 201-209, 222-226 waits for an ADVERTISEMENT message from any active CCA-capable node 222-226 for $T_2$ units of time. As previously discussed with relation to $T_1$, the time period $T_2$ will also be application-dependent. Time period $T_2$ can also be dependent upon the environment in which the sub-network 200 is placed.

The node 201-209, 222-226 keeps retrying for every $T_2$ units of time until a CCA-capable node 222-226 sends an ADVERTISEMENT message. For purposes of discussion, assume that CCA-capable nodes 222-226 responded with an ADVERTISEMENT message. The node 201-209, 222-226 performs the action of selecting and assigning a gateway CCA 614, wherein one of the CCA-capable nodes 222-226 that responded is selected and assigned to be the new gateway CCA. One skilled in the art will appreciate that there are a variety of different methods that may be used to select which CCA-capable node 222-226 that responded with an ADVERTISEMENT message will be assigned to be the new gateway CCA. For example, in one aspect, a node 201-209, 222-226 may choose as its new gateway CCA the CCA-capable node that has the lowest network ID 222 from the CCA-capable nodes 222-226 that respond with an ADVERTISEMENT message. An example of network IDs may be the IP-address of the CCA-capable node 221-226 or even assigned IDs such as the reference numerals in the FIGs. This whole procedure is repeated every $T_1$ units of time. The broadcast messages need to reach beyond a single hop in the ad-hoc network. Consequently, all nodes rebroadcast a broadcast message upon receiving one for the first time.

The resulting number of GATEWAY_STATUS and KEEP_ALIVE messages that flow through the network is $2m*(1/T_1)$ unicast messages per unit time. However, when a CCA is determined to be inactive, there will be a flood of m CCA_SOLICIT broadcast messages in the worst case and 1/m broadcast messages for the average case. The replies to CCA_SOLICIT messages are unicast messages and can be up to $(n-1)*m$ messages in the worst case and $(n-1)$ for the average case.

(b) Node-Initiated and Proactive

Figure 7:
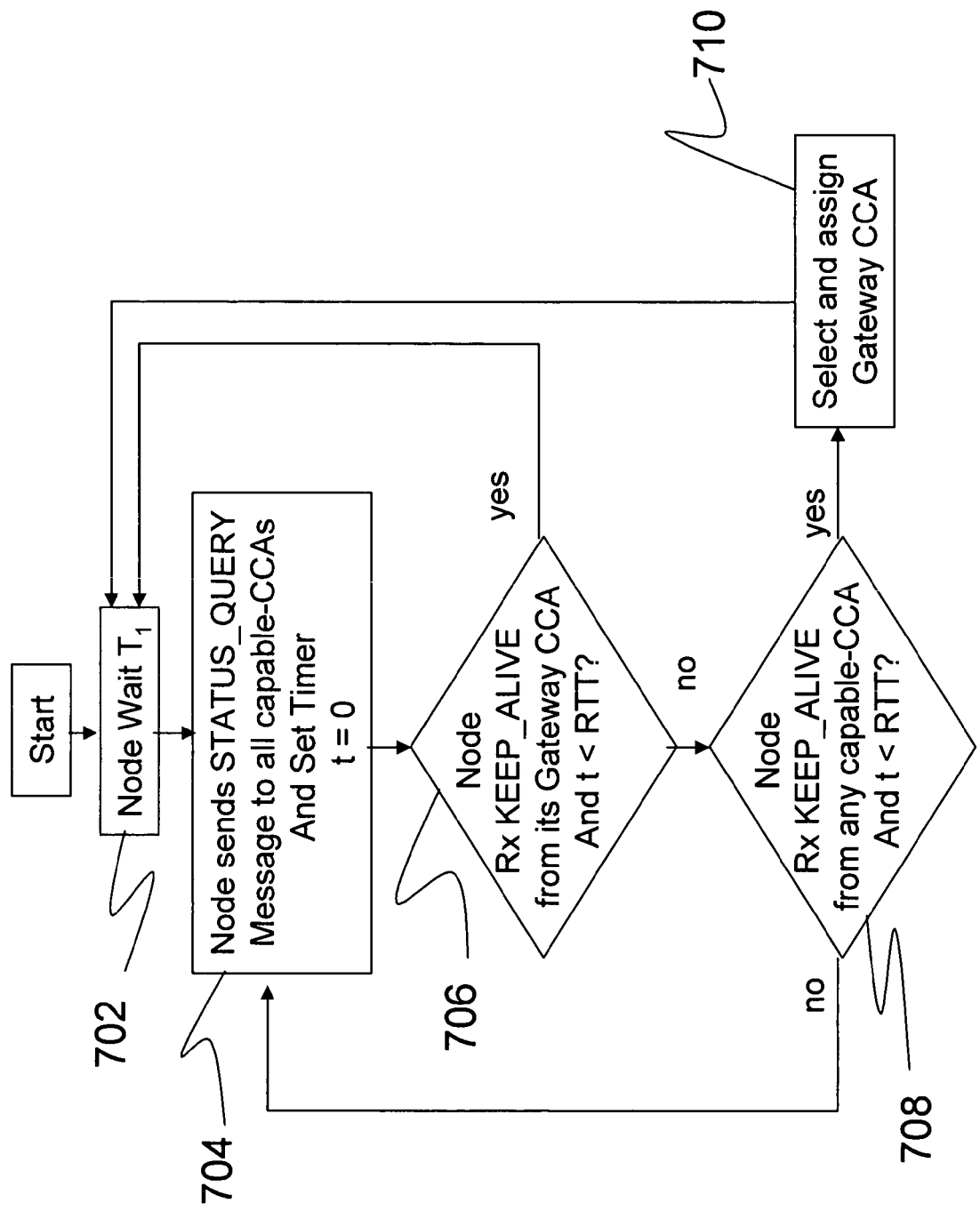
FIG. 7 is a flow diagram of the node-initiated and proactive algorithm in accordance with the present invention.

In the node-initiated and proactive case, each node keeps track of all active CCA capable nodes by periodically pinging all the CCA-capable nodes. When the gateway CCA that the node is affiliated with does not respond to ping messages, the node switches to one of the CCA-capable nodes that recently responded to its ping message. FIG. 7 is a flow diagram of the node-initiated and proactive algorithm. In this algorithm, the nodes have to keep track of all the CCA-capable nodes in the network. This is useful for fast recovery if the gateway CCA becomes inactive, but at the cost of an increase in the overhead.

As shown in FIG. 7, each node 201-209, 222-226 performs a waiting action 702, wherein each node 201-209, 222-226 waits a time $T_1$. As explained in the previous section, $T_1$ will vary depending upon the specific implementation of the sub-network 200. Each node 201-209, 222-226 then performs an operation of querying the CCA-capable nodes 704, wherein each node 201-209, 222-226 sends a STATUS_QUERY message to all of the known CCA-capable nodes 221-226 and setting a timer. Each CCA-capable node 221-226 that is active, i.e. has not been destroyed, is not blocked by terrain, or has power and is capable of responding, performs an operation of responding with its status 704 by sending a KEEP_ALIVE message back to the node 201-209, 222-226. Each node 201-209, 222-226 performs an operation of checking for its gateway CCA 706 by collecting the KEEP_ALIVE messages and determining if its gateway CCA 221 responded with a KEEP_ALIVE message within a desired retransmission time-out (RTT) amount of time. If the gateway CCA 221 responded, then the node 201-209, 222-226 performs the waiting action 703 and the process repeats. If the gateway CCA 221 does not respond, then the node will perform an operation of finding a new gateway 708, in which the node 201-209, 222-226 determines if any of the other CCA-capable nodes 222-226 have responded within the desired RTT amount of time. If another CCA-capable node 222-226 has responded within RTT period, the node 201-209, 222-226 will perform an operation of selecting and assigning a new gateway CCA 710. One skilled in the art will appreciate that there are a variety of different methods that may be used to select which CCA-capable node 222-226, responding with a KEEP_ALIVE message, will be designated as the new gateway CCA. For example, in one prospective example, a node may choose as its new gateway CCA 222, the CCA-capable node that has the lowest network ID from the CCA-capable nodes that responded with a KEEP_ALIVE message. Thus, if CCA-capable nodes 222, 224 and 226 respond, node 201 may choose CCA-capable node 222 as its new gateway CCA.

If no CCA-capable nodes 221-226 respond to the node's 201-209, 222-226 KEEP_ALIVE message before the RTT period expires, the node 201-209, 222-226 will repeat the operation of querying the CCA-capable nodes 704.

The number of messages in normal case is $m*n*(1/T_1)$ unicast messages per unit time. When a failure is detected, the switch-over time to a new gateway CCA is close to zero in most cases, and is the same as for the node-initiated, reactive case when no other CCA-capable node responds to CCA_STATUS query message.

(c) CCA-Capable Node-Initiated and Reactive

Figure 8A:
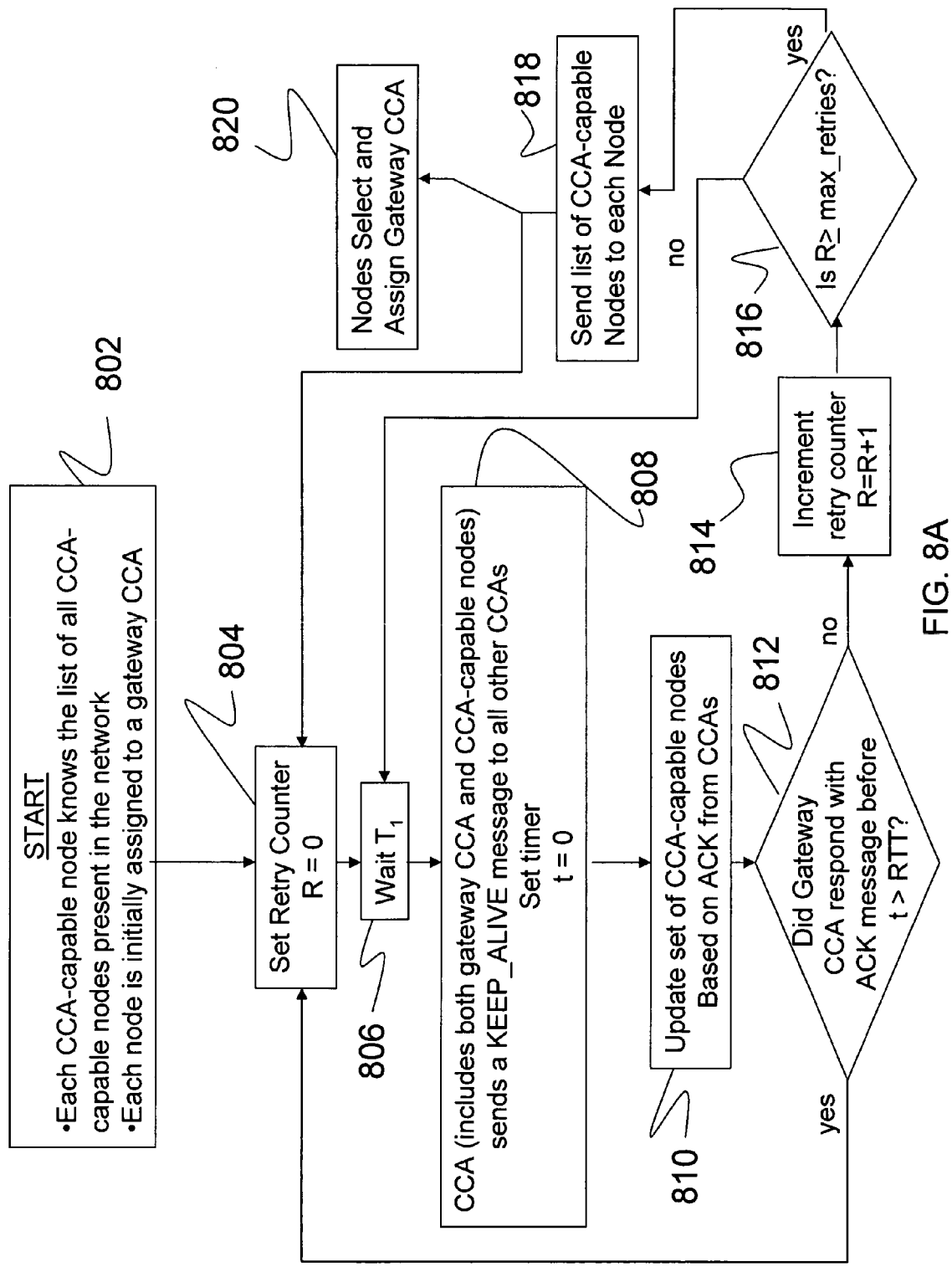
FIG. 8A is a flow diagram of one prospective example of the CCA-initiated and reactive algorithm in accordance with the present invention.

For the CCA-capable node-initiated reactive case, each CCA-capable node keeps track of the active CCA-capable nodes. FIG. 8A is a flow diagram of one prospective example of the CCA-initiated and reactive algorithm. At the beginning of the algorithm 802, each CCA-capable node 221-226 knows the list of CCA-capable nodes 221-226 present in the sub-network 200. In addition, each node 201-201, 222-226 is initially assigned to a gateway CCA 221. Each CCA-capable node 221-226 also performs an operation of setting a retry-counter 804, wherein the retry-counter is initially set to zero. Each CCA-capable node 221-226 performs an action of waiting 806, wherein each CCA-capable node 221-226 waits for a time period $T_1$. As previously discussed the time period $T_1$ is application specific.

After waiting, each CCA-capable node 221-226 performs an operation of querying each CCA-capable node 808, wherein each CCA-capable node 221-226 sends the KEEP_ALIVE message to all other CCA-capable nodes 221-226 and sets a timer t=0. Each CCA-capable node 221-226 responds to another CCA-capable node's KEEP_ALIVE message with an acknowledgment message (KEEP_ALIVE_ACK). Each CCA-capable node 221-226 performs an operation of updating 810, wherein each CCA-capable node 221-226 updates its list of CCA-capable nodes based on the KEEP_ALIVE_ACK messages from the other CCA-capable nodes.

Each CCA-capable node 221-226 then performs an operation of checking for gateway CCA response 812, wherein each CCA-capable node 221-226 checks to see if the gateway CCA 221 has responded with a KEEP_ALIVE_ACK message. If the gateway CCA 221 has responded, the CCA-capable node 221-226 resets the retry-counter and the algorithm is repeated. If the gateway CCA 221 does not respond, the CCA-capable node 221-226 performs an operation of incrementing the retry-counter 814, wherein the CCA-capable node 221-226 preferably updates the retry-counter by one. Then, the CCA-capable node 221-226 performs an operation of comparing 816, wherein the CCA-capable node 221-226 compares the value of the retry-counter to a predetermined max number of retries. One skilled in the art will appreciate that under certain conditions, the max number of retries may be set to 1 or a retry-counter may not be implemented, if the application requires quick determination that a gateway CCA is not active.

If the max number of retries has not been exceeded, the CCA-capable node will re-perform the operation of sending a KEEP_ALIVE message 808. A particular CCA-capable node 221-226 is generally labeled as inactive if this CCA-capable node does not respond to a predetermined number of multiple retries of the KEEP_ALIVE message transmissions. One skilled in the art will appreciate that a retry-counter may be used to collect the number of times that a CCA-capable node (which is not a gateway CCA) has not responded to a KEEP_ALIVE message.

If the gateway CCA 221 does not respond after the max number of retries, i.e., it is found to be inactive, each CCA-capable node 222-226 performs an operation of sending the list of active CCA-capable nodes 818, wherein each CCA-capable node 221-226 transmits to all of the other nodes 201-209, 221-226 the list of CCA-capable nodes have responded to the KEEP_ALIVE message and are thus active. The nodes 201-209, 222-226 previously using the inactive CCA-capable node 221 as their gateway CCA next perform an operation of selecting and assigning a new gateway CCA 820, wherein each node 201-209, 222-226 selects and assigns as its new gateway CCA a CCA-capable node that is active and within its communication range. One skilled in the art will appreciate that there are a variety of different methods that may be used to determine which CCA-capable node in the list of active CCA-capable nodes will be assigned to be the new gateway CCA. For example, in one prospective example, a node may choose as its new gateway CCA, the CCA-capable node that has the lowest network ID from the list of CCA-capable nodes.

Figure 8B:
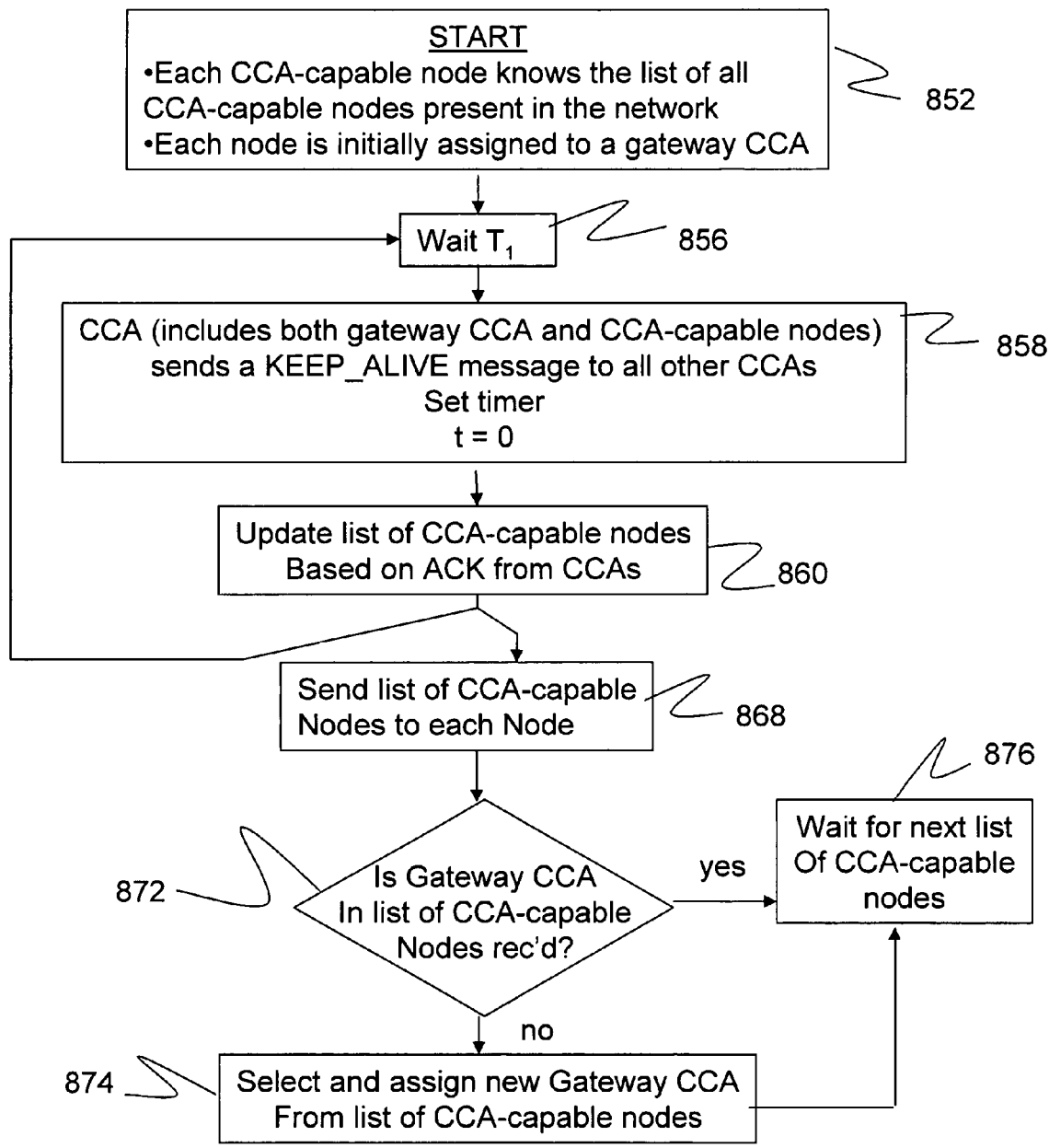
FIG. 8B is a flow diagram of a second prospective example of the CCA-initiated and reactive algorithm in accordance with the present invention.

FIG. 8B is a flow diagram of a second prospective example of the CCA-initiated and reactive algorithm. At the beginning of the algorithm 852, each CCA-capable node 221-226 knows the list of CCA-capable nodes 221-226 present in the sub-network 200. In addition, each node 201-201, 222-226 is initially assigned to a gateway CCA 221. Each CCA-capable node 221-226 performs an action of waiting 856, wherein each CCA-capable node 221-226 waits for a time period $T_1$. As previously with respect to FIG. 6 above, the time period $T_1$ is application specific.

After waiting, each CCA-capable node 221-226 performs an operation of sending a KEEP_ALIVE message 858, wherein each CCA-capable node 221-226 sends the KEEP_ALIVE message to all other CCA-capable nodes 221-226 and sets a timer t=0. Each CCA-capable node 221-226 responds to another CCA-capable node's KEEP_ALIVE message with an acknowledgment message (KEEP_ALIVE_ACK). Each CCA-capable node 221-226 performs an operation of updating 860, wherein each CCA-capable node 221-226 updates its list of active CCA-capable nodes based on the KEEP_ALIVE_ACK messages it receives.

Each CCA-capable node 221-226 next performs an operation of sending 868, wherein each CCA-capable node 221-226 sends the list of CCA-capable nodes 222-226 that are active to all the nodes 201-209, 222-226. The nodes 201-209, 222-226 receive the list of active CCA-capable nodes 222-226 and perform an operation of checking 872, wherein each node 201-209, 222-226 checks to see if its current gateway CCA 221 is in the list of active CCA-capable nodes 222-226. If the gateway CCA 221 is in the list of active CCA-capable nodes, then the node 201-209, 222-226 enters a wait state 826 until the next list of CCA-capable nodes is received. If the gateway CCA 221 is not in the list of active CCA-capable nodes 222-226 then the node 201-209, 222-226 performs operations of selecting and assigning 824, wherein the node 201-209, 222-226 selects and assigns a new gateway CCA in its communication range from the list of active CCA-capable nodes 222-226. One skilled in the art will appreciate that there are a variety of different methods that may be used to determine which CCA-capable node in the list of active CCA-capable nodes will be assigned to be the new gateway CCA. For example, in one prospective example, a node may choose as its new gateway CCA, the CCA-capable node that has the lowest network ID from the list of CCA-capable nodes.

In the CCA-capable node-initiated reactive case, there is a flow of $n*(n-1)*1/T_1$ unicast messages per unit time and $n-1$ broadcast messages upon detection of a faulty CCA-capable node. The detection time is $T_1/2$ seconds, on the average.

(d) CCA-Capable Node-Initiated and Proactive

Figure 9:
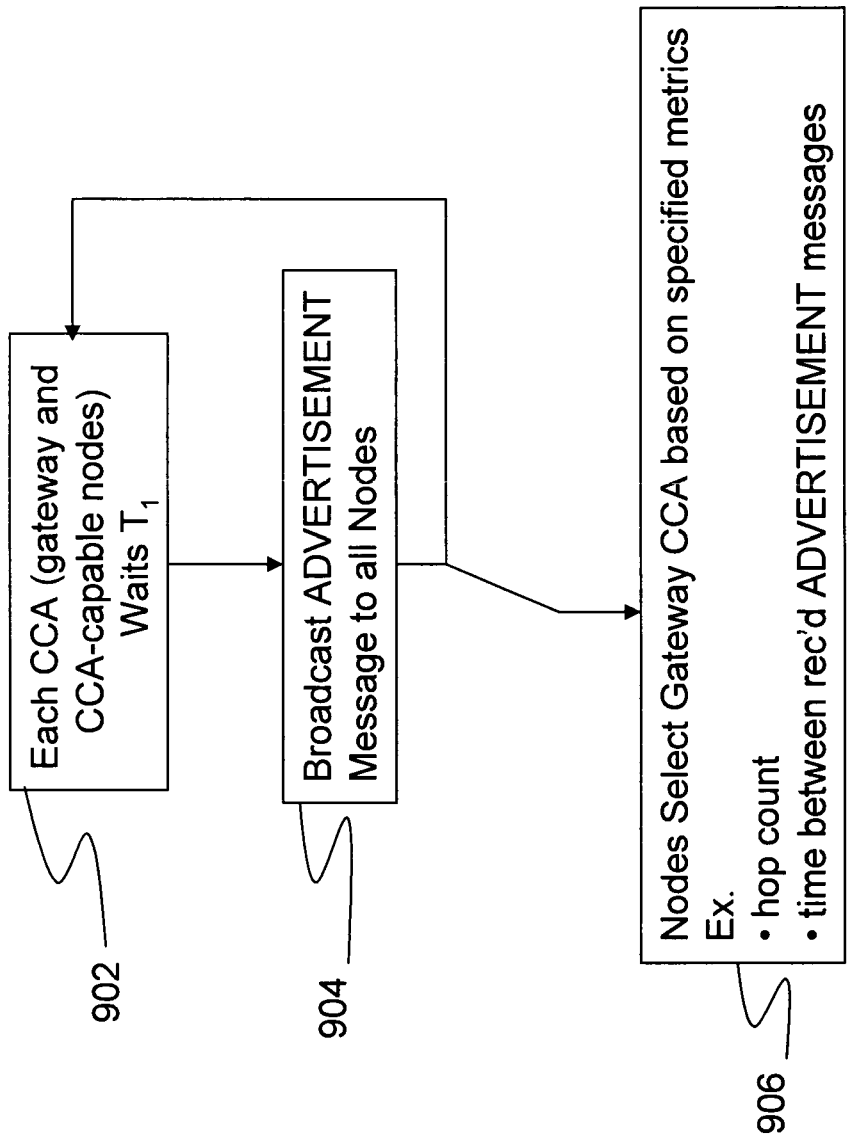
FIG. 9 is a flow diagram of the CCA-initiated and proactive algorithm in accordance with the present invention.

FIG. 9 is a flow diagram of the CCA-initiated and proactive algorithm. Each CCA-capable node 221-226 performs an action of waiting 902, wherein each CCA-capable node 221-226 waits for a time period $T_1$. As previously discussed in relation to FIG. 6 above, the time period $T_1$ is application specific.

After waiting time period $T_1$, each CCA-capable nodes 221-226 performs an operation of broadcasting an ADVERTISEMENT message 904, wherein each CCA-capable nodes 221-226 broadcasts an ADVERTISEMENT message to all nodes 201-209, 221-226. Each node 201-209, 221-226 that receives such a message from a CCA-capable node 221-226 performs the operation of deciding to switch 906, wherein each node 201-209, 221-226 decides whether to switch its gateway CCA to a new CCA-capable node 221-226 based upon user-specified metrics. Two possible user-specified metrics are: (i) hop count and (ii) a user-specified formula that compares last time, $T_{last}$ at which an ADVERTISEMENT message was received from the current gateway CCA. If the hop count to the new CCA-capable node 221-226 is less than the current gateway CCA's hop count, or if the user-specified formula $T_{last}<(current\_time-2*(T_1))$ is true, then the node sets the 'better' CCA-capable node as its new gateway CCA. One skilled in the art will appreciate that in this algorithm, several different CCA-capable nodes may be used by the various nodes as gateway CCAs.

This CCA-capable node-initiated proactive solution requires $n*1/T_1$ number of broadcast messages per unit time, where $1/T_1$ is the frequency of ADVERTISEMENT message broadcasts. The switchover time upon detection of a faulty CCA is negligible, but the detection time itself is $T_1*(3/2)$ units, on the average.

(e) Failure Recovery Considerations

One skilled in the art will appreciate that each of the algorithms discussed above has advantages and disadvantages regarding its overhead, response and implementation. As with any network, the best solution depends on the needs of the system. For example, if using the number of messages exchanged, detection time and switchover times as parameters, the CCA-capable node-initiated solutions are desirable since they can make use of the connectivity though the hybrid network, and also present low overhead on the communication infrastructure in the sub-network. Specifically, when looking to the number of messages, the CCA-capable node-initiated and reactive solution is optimal because all the messaging is only between CCA-capable nodes.

II. Security

As previously discussed, in some applications, the gateway CCA may be confiscated and manipulated by a hacker or someone desiring to disrupt the network communications. The confiscated/manipulated CCA is henceforth referred to as a "malicious CCA." One problem that arises as a result of the manipulation is that if this CCA-capable node manages to become the gateway CCA, either during a regular gateway CCA rotation step or by subterfuge, then all communication in the system is rendered insecure, or worse. The ideal fault-tolerance goal for this scenario is to prevent the malicious node from becoming the gateway CCA, or from interfering in the gateway CCA selection or data routing tasks.

A gateway CCA attracts a lot of communication from nearby nodes as part of its regular function of routing packets to and from the sub-network. However, an analysis of the traffic pattern might reveal the position information of the gateway CCA, thus making it susceptible to attacks or confiscation. To avoid these problems (as well as for power conservation reasons), it is clear that no CCA-capable node 221-226 should be the gateway CCA for long periods. Instead, the task of being the gateway CCA in a sub-network should be rotated among the CCA-capable nodes 221-226 in the sub-network 200. In addition, no node 201-209, 221-226 should use the same gateway CCA for communication for long periods. This is to avoid a malicious node from claiming to be the gateway CCA and controlling the packets transmitted and received from that node. This also avoids the collection of contiguous encrypted packets of data by the malicious CCA, where the contiguity may become helpful in decrypting the data or revealing of the key used to encrypt the data.

Figure 10:
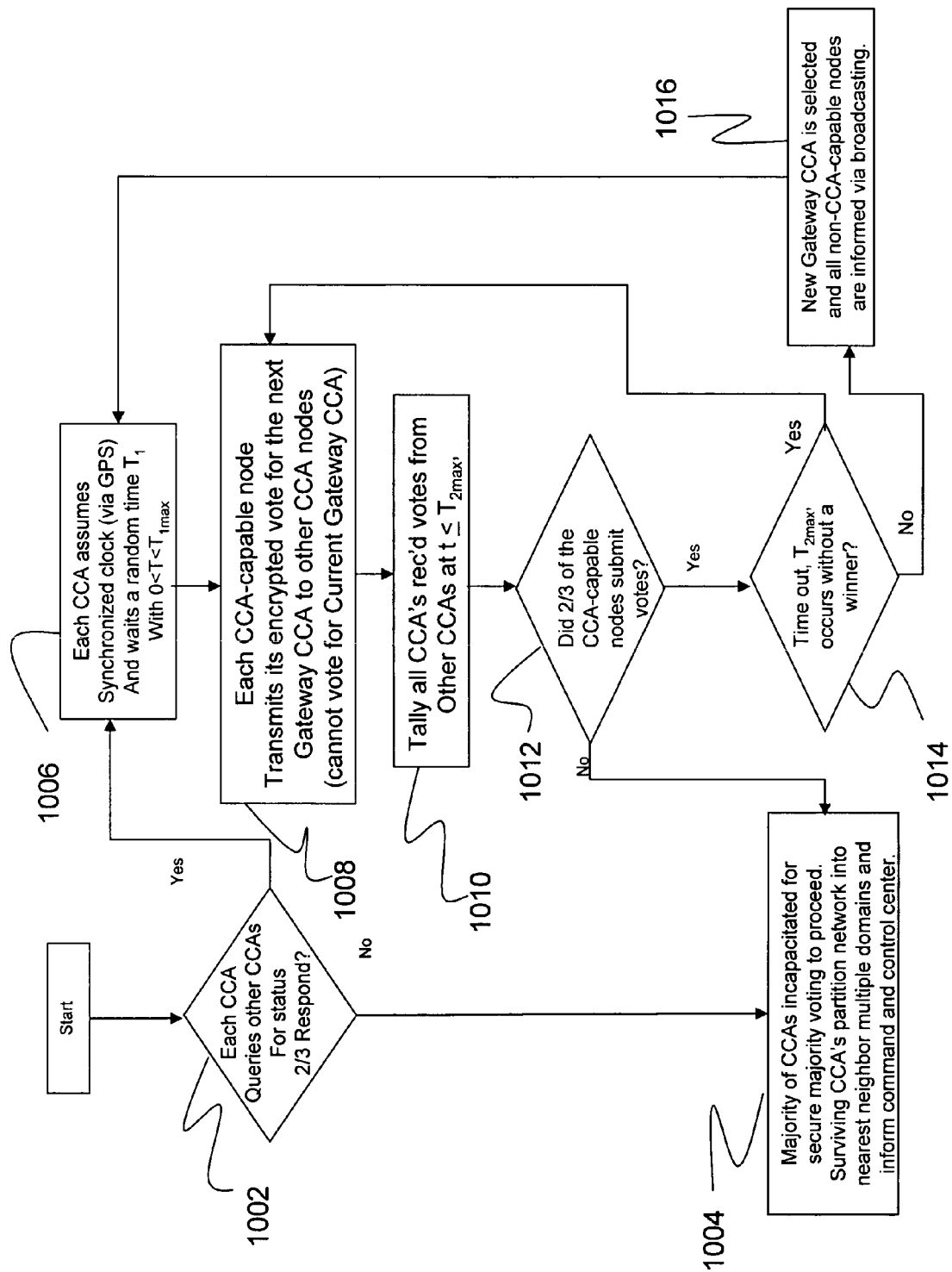
FIG. 10 is a flow diagram of a CCA selection algorithm for security in accordance with the present invention.

FIG. 10 is a flow diagram of a CCA selection algorithm for security in which the algorithm that assigns the role of the gateway CCA among the CCA-capable nodes 221-226 in a pseudo-random fashion. This algorithm follows at least these three criteria:

i. No gateway CCA should be allowed to be active for a long period of time;
ii. No node should use a single gateway CCA for a long period of time; and
iii. The order in which CCA-capable nodes become gateway CCAs should not be pre-decided or predictable.

If the selection sequence is pre-decided, then the confiscation of a CCA-capable node will allow the malicious node to know in advance exactly the times when each CCA becomes the gateway CCA. It will also know which gateway CCA is being used by each node. To avoid this vulnerability, the gateway CCA selection algorithm follows the following fourth criterion: i.e. a gateway CCA should be selected just prior to that time period where it will be the gateway CCA, by at least a majority of CCA-capable nodes participating in the selection procedure. This is a distributed majority selection problem, which is a modified form of the 'Byzantine Generals Problem' that has been extensively studied in L. Lamport, R. Shostak and M. Pease, The Byzantine Generals Problem, ACM Transactions on Programming, Language and Systems, 4(3), July 1982, pp. 382-401. For the case of CCAs in mobile ad-hoc networks, the general algorithm has been modified to satisfy all four criterion above.

(a) The Gateway CCA Selection Algorithm.

The general flowchart of the CCA selection algorithm is shown as FIG. 10. The precondition for this algorithm is that every CCA-capable node 221-226 knows the list of all other CCA-capable nodes 221-226 in the ad-hoc sub-network 200. The same KEEP_ALIVE-based mechanism as described in previous sections is used. The properties of the CCA-capable nodes assumed in this system are: (i) the CCA-capable nodes are synchronized (almost synchronized because of accessibility to GPS for all CCA-capable nodes), (ii) the messages may be lost, and (iii) not all CCA-capable nodes are reliable.

The gateway CCA selection algorithm has two phases. During the initialization phase, each CCA-capable node 221-226 looks up its list of all other known CCA-capable nodes in its sub-network 200 and performs a status query operation 1002, wherein each CCA-capable node 221-226 queries all other CCA-capable nodes 221-226 to determine their states. Next, each CCA-capable node 221-226 forms a list of 'voting CCAs,' wherein the list comprises CCA-capable nodes which responded to the status query message. When there is a malicious CCA-capable node among this group of voting nodes, then at least four CCA-capable nodes are required to be active, otherwise the impossibility situation of the Byzantine Generals Problem occurs. If there are less than four CCA-capable nodes, the default operation mode would be for each CCA-capable node to assume the role of being the gateway CCA for all the nodes within one hop distance of itself (each node that is within one hop distance of more than one CCA-capable node decides locally which CCA-capable node to use as its gateway CCA). Thus, if less than four CCA-capable nodes respond to the status query message, then the sub-network is partitioned to accommodate multiple gateway CCAs, each gateway CCA servicing the nodes closest to it in order to minimize the data manipulation activities of the malicious node. The CCA-capable nodes 221-226 also perform an action of informing 1004, wherein the CCA-capable nodes 221-226 inform a command and control center of the impossibility situation. Then, if necessary, depending upon the application scenario, the nodes may choose to stop transmitting all sensitive inter-sub-network data altogether.

If the impossibility situation mentioned above does not occur, i.e. more than four CCA-capable nodes are active, then each CCA-capable node 221-226 performs an operation of waiting 1006, wherein each CCA-capable node 221-226 waits a random time between 0 to $T_{1max}$. As discussed above, $T_{1max}$ is chosen based upon the specific application in which the sub-network 200 is being used. The CCA-capable node 221-226 then performs an operation of generating its vote 1008, wherein each CCA-capable node 221-226 votes for the new gateway CCA from the list of active CCA-capable nodes 221-226, excluding the current gateway CCA 221 as a possible candidate.

The CCA-capable node 221-226 then performs an operation of encrypting its vote 1008, wherein each CCA-capable node 221-226 encrypts its vote using underlying encryption technology, and transmits its vote to all the other CCA-capable nodes 221-226 in the active list. Next, each CCA-capable node 221-226 performs an action of tallying, wherein each CCA-capable node 221-226 collects and tallies the votes sent by the other CCA-capable nodes within time period $T_{2max}$. One skilled in the art will appreciate that $T_{2max}$ is an application-specific time parameter.

Since the communication path between CCA-capable nodes 221-226 can have intermittent failures, acknowledgement-based mechanism is preferably used (e.g. IEEE 802.11) to increase the reliability of message exchange in each round.

Each CCA-capable node 221-226, then performs an operation of determining received number of votes 1012, wherein each CCA-capable node 221-226 determines if at least ⅔ of the CCA-capable nodes 221-226 responded with a vote. If less than ⅔ responded, the impossibility of the Byzantine Generals problem occurs, and again the sub-network 200 is partitioned, and the CCA-capable nodes perform the action of informing 1004, wherein the command and control center is informed of the impossible situation. If at least ⅔ of the CCA-capable nodes 221-226 respond, then the CCA-capable nodes 221-226 perform an action of determining if there is a CCA that has received the most votes 1014, wherein each CCA-capable node 221-226 determines if there is a CCA-capable node which received more votes than any other CCA-capable node before time $T_{2max}$, whereby the CCA-capable node receiving the most votes is the clear winner. If a clear winner emerges, the CCA-capable nodes 221-226 perform the operation of selecting and switching to this new gateway CCA 1016, wherein each CCA-capable node 221-226 selects and switches its assigned gateway CCA to the CCA-capable node 221-226 which received the most votes. All the nodes 201-209 are then informed of this decision by all the CCA-capable nodes 221-226.

If either a timeout occurs or no clear winner emerges, then the algorithm is repeated (up to a software settable number of times, depending upon the application requirements).

The gateway CCA selection algorithm is periodically executed with large enough timeout periods $T_{1max}$ and $T_{2max}$ to prevent to frequent gateway CCA changes. Since all CCA-capable nodes are almost synchronized, each CCA-capable node knows when the gateway CCA selection algorithm needs to be (re)started. It is interesting to note that this algorithm may also be used if the current gateway CCA is destroyed or its link with the rest of the hybrid network is blocked. Thus, this gateway CCA selection algorithm can be used as another variation (albeit inefficiently) of the CCA fault recovery system described earlier in the Recovery from Failure section.

What is claimed is:

1. A method for increasing the fault tolerance in a network, said method comprising acts of:
   associating a plurality of nodes with a sub-network, each of said plurality of nodes capable of sending and receiving data;
   adding a plurality of cross layer communication agent capable nodes, herein referred to as CCA-capable nodes, to said sub-network, said plurality of CCA-capable nodes capable of receiving data from and sending data to said plurality of nodes; and
   determining which one of the plurality of CCA-capable nodes to assign as a gateway CCA, whereby said gateway CCA is used by each one of said plurality of nodes within said sub-network to communicate with the rest of the network; wherein
   the act of determining the assignment of the gateway CCA further comprises acts of:
   designating one of the plurality of CCA-capable nodes to be a gateway CCA;
   broadcasting a message from each CCA-capable node to the plurality of nodes every T1 seconds;
   wherein T1 is a predetermined time period; and
   selecting a new gateway CCA based upon the message from each CCA-capable node; and wherein the act of selecting further comprises acts of:
   determining a current time at which the message from each CCA-capable node was received;
   retrieving a gateway time TLAST at which a message from a gateway CCA was received;
   wherein TLAST is determined as a time when the message from the gateway CCA was received last;
   designating each CCA-capable node as a Responding CCA-capable node when TLAST<(current time−2(T1)) is true for the CCA-capable node; and
   selecting and assigning the new gateway CCA from the Responding CCA-capable nodes.

2. The method of claim 1, wherein the act of determining the assignment of the gateway CCA further comprises sub-acts of:
   querying the gateway CCA from each node to determine whether the gateway CCA is active and awaiting a response, and when:
   the gateway CCA responds, repeating the querying act; otherwise,
   broadcasting a solicit message for receipt by CCA-capable nodes and awaiting a response, and when:
   a CCA-capable node responds, assigning a CCA-capable node as the gateway CCA; otherwise,
   repeating the broadcasting act.

3. The method of claim 2, wherein when a plurality of CCA-capable nodes respond, selecting from the plurality of CCA-capable nodes responding, a single CCA-capable node for use by all of the nodes as the gateway CCA.

4. The method of claim 1, wherein said act of determining the assignment of the gateway CCA further comprises acts of:
   querying the plurality of CCA-capable nodes, from each node, to determine whether the plurality of CCA-capable nodes are active and awaiting a response, and when:
   the gateway CCA responds, repeating the querying act; otherwise,
   changing the CCA-capable node assigned to be the gateway CCA based upon a response from the plurality of CCA-capable nodes.

5. The method of claim 4, wherein when a plurality of CCA-capable nodes respond, selecting from the plurality of CCA-capable nodes responding, a single CCA-capable node for use by all of the nodes as the gateway CCA.

6. The method of claim 1, wherein said act of determining the assignment of the gateway CCA further comprises acts of:
   compiling a list of Responding CCA-capable nodes on at least one CCA-capable node;
   querying each CCA-capable node, from at least one CCA-capable node, in the list to determine the state of each CCA-capable node;
   updating the list of Responding CCA-capable nodes based on a response from each of the CCA-capable nodes; and
   checking for a response from the gateway CCA, and when:
   the gateway CCA responds, repeating the querying act; otherwise, transmitting the list of Responding CCA-capable nodes to the plurality of nodes in the sub-network; and
   selecting and assigning a new gateway CCA from the list of Responding CCA capable nodes.

7. The method of claim 1, wherein the act of determining the assignment of the gateway CCA further comprises acts of:
   querying each CCA-capable node, from at least one CCA-capable node, in the plurality of Responding CCA-capable nodes to determine its state;
   updating a list of Responding CCA-capable nodes, stored on the at least one CCA capable node, based on a response from each of the CCA-capable nodes;
   sending, from the at least one CCA-capable node, the list of Responding CCA-capable nodes to the plurality of nodes in the sub-network;
   waiting to repeat the querying act; and
   checking, by at least one node in the plurality of nodes, the list of Responding CCA capable nodes for the gateway CCA, and
   when: the gateway CCA is in the list of CCA-capable nodes, said
   at least one node waiting for the next list of Responding CCA-capable nodes; otherwise,
   selecting and assigning a new gateway CCA from the list of Responding CCA-capable nodes.

8. The method of claim 1, wherein said act of determining the assignment of the gateway CCA further comprises acts of:
transmitting a vote from each Responding CCA-capable node to all other CCA-capable nodes identifying which CCA-capable node has been designated a subsequent gateway CCA; and tallying said votes for each CCA-capable node, and
when: one CCA-capable node receives more votes than any of the other CCA capable nodes,
assigning the one CCA-capable node to become the new gateway CCA, otherwise repeating the transmitting act.

9. The method of claim 8 further comprising an act of determining if at least 2/3 of the plurality of CCA-capable nodes are active, and wherein at least 2/3 of the CCA-capable nodes must respond before performing the act of transmitting the vote.

10. The method of claim 1, wherein the act of associating the plurality of nodes further comprises an act of associating the plurality of nodes in an ad-hoc manner.

11. The method of claim 1, further comprising an act of providing at least a portion of the plurality of nodes and CCA-capable nodes that are able to be mobile.

12. A network comprising:
a plurality of nodes, each of said plurality of nodes capable of sending and receiving data, the plurality of nodes forming a first sub-network;
a plurality of cross layer communication agent capable nodes, herein referred to as CCA-capable nodes, at least one of said plurality of CCA-capable nodes capable of communicating with the plurality of nodes and capable of communicating with a second sub-network, wherein
the plurality of nodes and the plurality of CCA-capable nodes communicate to determine which CCA-capable node to assign as a gateway CCA, whereby
the gateway CCA is used by each one of the plurality of nodes and the remaining CCA-capable nodes to communicate with the second sub-network;
a designation instruction block in each of the CCA-capable nodes for designating one of the plurality of CCA-capable nodes to be a gateway CCA;
a broadcast message sent from each CCA-capable node every T1 seconds to the plurality of nodes; wherein
T1 is a predetermined time period; and
a selecting instruction block in each of the CCA-capable nodes for selecting a new gateway CCA based upon the broadcast message from each CCA-capable node; and wherein
the selecting instruction block comprises:
a current time determination instruction block for determining a current time at which the broadcast message from each CCA-capable node was received;
a retrieving instruction block for retrieving a gateway time TLAST at which a message from the gateway CCA was received; wherein
TLAST is determined as a time when the message from the gateway CCA was received last;
a response-designating instruction block for designating each CCA-capable node as a Responding CCA-capable node when TLAST<(current time−2(T1)) is true for the CCA-capable node; and
a selecting and assigning instruction block for selecting and assigning the new gateway CCA from the Responding CCA-capable nodes.

13. The network of claim 12 further comprising:
a designation message for designating one of the plurality of Responding CCA-capable nodes as the gateway CCA;
a querying message sent from each node to the gateway CCA to determine whether the gateway CCA is active;
a timeout period where each node waits for a response from the gateway CCA, and
when: the gateway CCA responds, a second querying message is sent; otherwise, a solicit message is sent to the plurality of Responding CCA-capable nodes, and
when: a CCA-capable node responds, an assignment instruction block assigns the CCA-capable node as the gateway CCA; otherwise, a second solicit message is sent.

14. The network of claim 13, wherein when a plurality of CCA-capable nodes respond to the solicit message, the assignment instruction block selects a single CCA capable node from the plurality of CCA-capable nodes responding to the solicit message, for use by all of the nodes as the gateway CCA.

15. The network of claim 12 further comprising:
a designation message for designating one of the plurality of Responding CCA-capable nodes to be a gateway CCA;
a query message sent from each node for querying the plurality of Responding CCA-capable nodes to determine whether they are active;
a timeout period where each node waits for a response from each of the plurality of Responding CCA-capable nodes;
a gateway CCA response message, whereby
when the gateway CCA response message is received, a second query message is sent and
if no gateway CCA response message is received, an assignment instruction block changes the CCA-capable node assigned to be the gateway CCA based upon a response from the plurality of Responding CCA-capable nodes.

16. The network of claim 15, when a plurality of CCA-capable nodes respond to the query message, the assignment instruction block selects a single CCA-capable node from the plurality of Responding CCA-capable nodes responding to the solicit message, for use by all of the nodes as the gateway CCA.

17. The network of claim 12 further comprising:
a designation message for designating one of the plurality of Responding CCA-capable nodes to be a gateway CCA;
a compiling instruction block for compiling a list of CCA-capable nodes on at least one CCA-capable node of the plurality of Responding CCA-capable nodes;
a query message sent from the at least one CCA-capable node for querying each CCA-capable node in the list to determine its state, whereby the compiling instruction block updates the list of Responding CCA-capable nodes based on a response from each of the CCA-capable nodes; and
checks for a response from the gateway CCA, and
when the gateway CCA responds, a second query message is sent; otherwise, a transmitting instruction block transmits the list of Responding CCA-capable nodes to the plurality of nodes in the sub-network; and
a selecting and assigning instruction block in each node selects and assigns a new gateway CCA from the list of Responding CCA-capable nodes.

18. The network of claim 12 further comprising:
a designation instruction block, on at least one CCA-capable node of the plurality of Responding CCA-capable nodes, for designating one of the plurality of Responding CCA capable nodes to be a gateway CCA;

a query message sent from at least one CCA-capable node of the plurality of CCA-capable nodes for querying each CCA-capable node in the plurality of Responding CCA-capable nodes to determine its state;

a compiling instruction block, on the at least one CCA-capable node, for compiling a list of CCA-capable nodes based on a response from each of the Responding CCA-capable nodes;

a sending instruction block, on the at least one CCA-capable node, for sending the list of Responding CCA-capable nodes to the plurality of nodes in the sub-network; and a checking instruction block, on the plurality of nodes, for checking the list of Responding CCA-capable nodes for the gateway CCA, whereby when the gateway CCA is in the list of Responding CCA-capable nodes the node waits for the next list of Responding CCA-capable nodes; otherwise, a selecting and assigning instruction block in each node selects and assigns a new gateway CCA from the list of Responding CCA-capable nodes.

19. The network of claim 12 further comprising:

a designation instruction block in each of the CCA-capable nodes for designating one of the plurality of Responding CCA-capable nodes to be a gateway CCA;

a transmitting instruction block for transmitting a vote from each CCA-capable node to all other CCA-capable nodes identifying which Responding CCA-capable node has been designated a subsequent gateway CCA; and a tallying instruction block in each of the CCA-capable nodes for tallying said votes for each Responding CCA-capable node, whereby when one Responding CCA-capable node receives more votes than any of the other CCA-capable nodes, an assigning instruction block assigns the one Responding CCA-capable node to become the new gateway CCA, otherwise the transmitting instruction block transmits a second vote.

20. The network of claim 19 further comprising a determination instruction block for determining if at least ⅔ of the plurality of CCA-capable nodes are active, and wherein at least ⅔ of the CCA-capable nodes must respond before the transmitting instruction block transmits a vote.

21. The network of claim 12, wherein the network is an ad-hoc network.

22. The network of claim 12, wherein at least a portion of the plurality of nodes and CCA-capable nodes are mobile.

23. A non-transitory computer-readable medium having computer-executable instructions for causing a computer to perform operations of:

associating a plurality of nodes with a sub-network, each of said plurality of nodes capable of sending and receiving data;

adding a plurality of cross layer communication agent capable nodes, herein referred to as CCA-capable nodes, to said sub-network, said plurality of CCA-capable nodes capable of receiving data from and sending data to said plurality of nodes; and determining which one of the plurality of CCA-capable nodes to assign as a gateway CCA, whereby said gateway CCA is used by each one of said plurality of nodes within said sub-network to communicate with the rest of the network wherein the act of determining the assignment of the gateway CCA further comprises acts of:

designating one of the plurality of CCA-capable nodes to be a gateway CCA;

broadcasting a message from each CCA-capable node to the plurality of nodes every T1 seconds;

wherein T1 is a predetermined time period; and selecting a new gateway CCA based upon the message from each CCA-capable node; and wherein the act of selecting a new gateway CCA further comprises acts of:

determining a current time at which the message from each CCA-capable node was received;

retrieving a gateway time TLAST at which a message from the gateway CCA was received;

wherein TLAST is determined as a time when the message from the gateway CCA was received last;

designating each CCA-capable node as a Responding CCA-capable node when TLAST<(current time−2 (T1)) is true for the CCA-capable node; and selecting and assigning a new gateway CCA from the Responding CCA-capable nodes.

24. The non-transitory computer-readable medium of claim 23, wherein the act of determining the assignment of the gateway CCA further comprises sub-acts of:

querying the gateway CCA from each node to determine whether it is active and awaiting a response, and when: the gateway CCA responds, repeating the querying act; otherwise, broadcasting a solicit message for receipt by CCA-capable nodes and awaiting a response, and when: a CCA-capable node responds, assigning a CCA-capable node as the gateway CCA; otherwise, repeating the broadcasting act.

25. The non-transitory computer-readable medium of claim 24, wherein when a plurality of CCA capable nodes respond, selecting from the plurality of CCA-capable nodes responding, a single CCA-capable node for use by all of the nodes as the gateway CCA.

26. The non-transitory computer-readable medium of claim 23, wherein said act of determining further comprises acts of:

querying the plurality of Responding CCA-capable nodes, from each node, to determine whether they are active and awaiting a response, and when: the gateway CCA responds, repeating the querying act; otherwise, changing the CCA-capable node assigned to be the gateway CCA based upon a response from the plurality of Responding CCA-capable nodes.

27. The non-transitory computer-readable medium of claim 26, wherein when a plurality of CCA capable nodes respond, selecting from the plurality of CCA-capable nodes responding, a single CCA-capable node for use by all of the nodes as the gateway CCA.

28. The non-transitory computer-readable medium of claim 23 wherein said act of determining the assignment of the gateway CCA further comprises acts of:

compiling a list of Responding CCA-capable nodes on at least one CCA-capable node of the plurality of Responding CCA-capable nodes;

querying each CCA-capable node, from the at least one CCA-capable node, in the list to determine its state;

updating the list of Responding CCA-capable nodes based on a response from each of the CCA-capable nodes; and checking for a response from the gateway CCA, and when: the gateway CCA responds, repeating the querying act; otherwise, transmitting the list of Responding CCA-capable nodes to the plurality of nodes in the sub-network; and electing and assigning a new gateway CCA from the list of Responding CCA capable nodes.

29. The non-transitory computer-readable medium of claim 23, wherein the act of determining further comprises acts of:
querying each CCA-capable node, from at least one CCA-capable node of the plurality of Responding CCA-capable nodes, in the plurality of Responding CCA-capable nodes to determine its state;
updating a list of Responding CCA-capable nodes, stored on the at least one CCA capable node, based on a response from each of the CCA-capable nodes;
sending, from the at least one CCA-capable node, the list of Responding CCA-capable nodes to the plurality of nodes in the sub-network; waiting to repeat the querying act; and
checking, by at least one node in the plurality of nodes, the list of Responding CCA capable nodes for the gateway CCA, and
when: the gateway CCA is in the list of Responding CCA-capable nodes, said at least one node waiting for the next list of CCA-capable nodes; otherwise, selecting and assigning a new gateway CCA from the list of Responding CCA-capable nodes.

30. The non-transitory computer-readable medium of claim 23 wherein said act of determining further comprises acts of:
transmitting a vote from each CCA-capable node to all other CCA-capable nodes identifying which Responding CCA-capable node has been designated a subsequent gateway CCA; and
tallying said votes for each Responding CCA-capable node, and
when: one Responding CCA-capable node receives more votes than any of the other Responding CCA capable nodes, assigning the one CCA-capable node to become the new gateway CCA, otherwise repeating the transmitting act.

31. The non-transitory computer-readable medium of claim 30 further comprising an act of determining if at least ⅔ of the plurality of CCA-capable nodes are active, and wherein at least ⅔ of the CCA-capable nodes must respond before performing the act of transmitting the vote.

32. The non-transitory computer-readable medium of claim 23 wherein the act of associating the plurality of nodes further comprises an act of associating the plurality of nodes in an ad-hoc manner.

33. The non-transitory computer-readable medium of claim 23 further comprising an act of allowing at least a portion of the plurality of nodes and CCA-capable nodes to be mobile.

34. A method for network communications, the method comprising actions of:
associating a node with a sub-network, the node capable of sending data to and receiving data from a plurality of cross layer communication agent capable nodes, herein referred to as CCA-capable nodes; and
determining which one of the plurality of CCA-capable nodes to assign as a gateway CCA, whereby
said gateway CCA is used by the node within said sub-network to communicate with the rest of the network; wherein
the act of determining the assignment of the gateway CCA further comprises acts of:
designating one of the plurality of CCA-capable nodes to be a gateway CCA;
broadcasting a message from each CCA-capable node every T1 seconds to the plurality of nodes;
wherein T1 is a predetermined time period; and
selecting a new gateway CCA based upon the message from each CCA-capable node; and wherein
the act of selecting the new gateway CCA further comprises acts of:
determining a current time at which the message from each CCA-capable node was received;
retrieving a gateway time TLAST at which a message from the gateway CCA was received;
wherein TLAST is determined as a time when the message from the gateway CCA was received last;
designating each CCA-capable node as a Responding CCA-capable node when TLAST<(current time−2 (T1)) is true for the CCA-capable node; and
selecting and assigning the new gateway CCA from the Responding CCA-capable nodes.

35. The method of claim 34, wherein the node further performs the acts of:
querying the gateway CCA from each node to determine whether it is active and awaiting a response, and
when: the gateway CCA responds, repeating the querying act; otherwise, broadcasting a solicit message for receipt by CCA-capable nodes and awaiting a response, and
when: a CCA-capable node responds, assigning a CCA-capable node as the gateway CCA; otherwise, repeating the broadcasting act.

36. The method of claim 35, wherein when a plurality of CCA-capable nodes respond, selecting from the plurality of CCA-capable nodes responding, a single CCA capable node for use by all of the nodes as the gateway CCA.

37. The method of claim 34 wherein said act of determining the assignment of the gateway CCA further comprises acts of:
querying the plurality of Responding CCA-capable nodes to determine whether they are active and awaiting a response, and
when: the gateway CCA responds, repeating the querying act; otherwise, changing the CCA-capable node assigned to be the gateway CCA based upon a response from the plurality of Responding CCA-capable nodes.

38. The method of claim 37, wherein when a plurality of CCA-capable nodes respond, selecting from the plurality of CCA-capable nodes responding, a single CCA-capable node for use by all of the nodes as the gateway CCA.

39. The method of claim 34 wherein the act of associating a node further comprises an act of associating the node in an ad-hoc manner.

40. The method of claim 34 further comprising an act of providing a node capable of being mobile.

41. A node comprising:
a non-transitory computer readable medium; and
a data processing system executing one or more instruction blocks stored on the non-transitory computer readable medium, wherein
said instruction blocks comprise:
a transmitting and receiving instruction block for communicating with a sub-network, the sub-network comprising of other nodes and a plurality of cross layer communication agent capable nodes, herein referred to as CCA-capable nodes; and
a determination instruction block for the node to determine which CCA-capable node to assign as a gateway CCA, whereby the gateway CCA is used by the node to communicate with a second sub-network;

wherein
the determination instruction block further comprises:
  a designation instruction block in each of the CCA-capable nodes for designating one of the plurality of CCA-capable nodes to be a gateway CCA; and
  a selection instruction block in each of the CCA-capable nodes for selecting a gateway CCA based upon a received active message from each CCA-capable node;
  wherein, the received active message is broadcasted from each CCA-capable node to at least the node every T1 seconds;
  wherein T1 is a predetermined time period; and wherein
the selection instruction block comprises:
  a current time determination instruction block for determining a current time at which the message from each CCA-capable node was received;
  a retrieving instruction block for retrieving a gateway time TLAST at which a message from the gateway CCA was received;
  wherein TLAST is determined as a time when the message from the gateway CCA was received last;
  a response-designating instruction block for designating each CCA-capable node as a Responding CCA-capable node when TLAST<(current time−2(T1)) is true for the CCA-capable node; and
  a selecting and assigning instruction block for selecting and assigning a new gateway CCA from the Responding CCA-capable.

42. The node of claim 41, wherein the determination instruction block further comprises:
  a designation instruction block for designating one of the plurality of CCA capable nodes as the gateway CCA;
  a querying message sent to the gateway CCA to determine whether the gateway CCA is active;
  a timeout period where the node waits for a response from the gateway CCA, and
  when: the gateway CCA responds, a second querying message is sent; otherwise, a solicit message is sent to the plurality of CCA-capable nodes, and
  when: a CCA-capable node responds, an assignment instruction block assigns the CCA-capable node as the gateway CCA; otherwise, a second solicit message is sent.

43. The node of claim 41, wherein when a plurality of CCA-capable nodes respond to the solicit message, the assignment instruction block selects a single CCA-capable node from the plurality of CCA-capable nodes responding to the solicit message, for use by the node as the gateway CCA.

44. The node of claim 41, wherein the determination instruction block further comprises:
  a designation message for designating one of the plurality of Responding CCA-capable nodes to be a gateway CCA;
  a query message for querying the plurality of CCA-capable nodes to determine whether the plurality of CCA-capable nodes are active;
  a timeout period where the node waits for a response from each of the plurality of CCA-capable nodes;
  a gateway CCA response message, whereby when the gateway CCA response message is received, a second query message is sent and
  if no gateway CCA response message is received an assignment instruction block changes the CCA-capable node assigned to be the gateway CCA based upon a response from the plurality of Responding CCA-capable nodes.

45. The node of claim 44, when a plurality of CCA-capable nodes respond to the query message, the assignment instruction block selects a single CCA-capable node from the plurality of CCA-capable nodes responding to the solicit message, for use by the node as the gateway CCA.

46. A non-transitory computer-readable medium having computer-executable instructions causing a computer to perform operations of:
  associating the node with a sub-network, the sub-network comprising of other nodes and a plurality of cross layer communication agent capable nodes, herein referred to as CCA-capable nodes; wherein
  the node is capable of sending and receiving data to and from the plurality of CCA-capable nodes; and
  determining which one of the plurality of CCA-capable nodes to assign as a gateway CCA, whereby
  said gateway CCA is used by the node within said sub-network to communicate with the rest of the network; wherein
  the act of determining the assignment of the gateway CCA further comprises acts of:
    designating one of the plurality of CCA-capable nodes to be a gateway CCA;
    broadcasting a message from each CCA-capable node every T1 seconds to the plurality of nodes;
    wherein T1 is a predetermined time period; and
    selecting a new gateway CCA based upon the message from each CCA-capable node; and wherein
  the act of selecting further comprises acts of:
    determining a current time at which the message was received;
    retrieving a gateway time TLAST at which a message from the gateway CCA was received;
    wherein TLAST is determined as a time when the message from the gateway CCA was received last;
    designating each CCA-capable node as a Responding CCA-capable node when TLAST<(current time−2(T1)) is true for the CCA-capable node;
    and selecting and assigning the new gateway CCA from the Responding CCA-capable nodes.

47. The non-transitory computer-readable medium of claim 46, wherein the act of determining the assignment of the gateway CCA further comprises sub-acts of:
  querying the gateway CCA from the node to determine whether the gateway CCA is active and awaiting a response, and
  when: the gateway CCA responds, repeating the querying act; otherwise, broadcasting a solicit message for receipt by CCA-capable nodes and awaiting a response, and
  when: a CCA-capable node responds, assigning a CCA-capable node as the gateway CCA; otherwise, repeating the broadcasting act.

48. The non-transitory computer-readable medium of claim 47, wherein when a plurality of CCA-capable nodes respond, selecting from the plurality of CCA-capable nodes responding, a single CCA-capable node for use by the node as the gateway CCA.

49. The non-transitory computer-readable medium of claim 46, wherein said act of determining the assignment of the gateway CCA further comprises acts of:
  querying the plurality of CCA-capable nodes to determine whether the plurality of CCA-capable nodes are active and awaiting a response, and
  when: the gateway CCA responds, repeating the querying act; otherwise, changing the CCA-capable node assigned to be the gateway CCA based upon a response from the plurality of CCA-capable nodes.

50. The non-transitory computer-readable medium of claim 49, wherein when a plurality of CCA capable nodes respond, selecting from the plurality of CCA-capable nodes responding, a single CCA-capable node for use by the node as the gateway CCA.

51. A method for network communications, the method comprising acts of:
associating a cross layer communication capable node, herein referred to as CCA-capable node, with a sub-network,
the sub-network comprising a plurality of CCA-capable nodes, the CCA-capable node capable of sending and receiving data to and from nodes within the sub-network; and
determining the CCA-capable node to assign as a gateway CCA, whereby said gateway CCA is used by the nodes within the sub-network to communicate with the rest of the network; wherein
the act of determining the assignment of the gateway CCA further comprises acts of:
designating one of the plurality of CCA-capable nodes to be a gateway CCA;
broadcasting a message from each CCA-capable node every T1 seconds to the plurality of nodes;
wherein T1 is a predetermined time period; and
selecting a new gateway CCA based upon the message from each CCA-capable node; wherein
the act of selecting further comprises acts of:
determining a current time at which the message from each CCA-capable node was received;
retrieving a gateway time TLAST at which a message from the gateway CCA was received;
wherein TLAST is determined as a time when the message from the gateway CCA was received last;
designating each CCA-capable node as a Responding CCA-capable node when TLAST<(current time−2 (T1)) is true for the CCA-capable node; and
selecting and assigning the new gateway CCA from the Responding CCA-capable nodes.

52. The method of claim 51, wherein said act of determining the assignment of the gateway CCA further comprises acts of:
compiling a list of Responding CCA-capable nodes on at least one CCA-capable node of the plurality of CCA-capable nodes;
querying each CCA-capable node, from the at least one CCA-capable node, in the list to determine the state of each CCA-capable node;
updating the list of Responding CCA-capable nodes based on a response from each of the CCA-capable nodes; and
checking for a response from the gateway CCA, and
when: the gateway CCA responds, repeating the querying act; otherwise, transmitting the list of Responding CCA-capable nodes to the plurality of nodes in the sub-network; and
selecting and assigning a new gateway CCA from the list of Responding CCA-capable nodes.

53. The method of claim 51, wherein the act of determining the assignment of the gateway CCA further comprises acts of:
querying each CCA-capable node, from at least one CCA-capable node in the plurality of CCA-capable nodes, in the plurality of CCA-capable nodes to determine the state of each CCA-capable node;
updating a list of Responding CCA-capable nodes, stored on the at least on CCA capable node, based on a response from each of the CCA-capable nodes;
sending, from the at least one CCA-capable node, the list of Responding CCA-capable nodes to the plurality of nodes in the sub-network;
waiting to repeat the querying act; and
checking, by at least one node in the plurality of nodes, the list of Responding CCA capable nodes for the gateway CCA, and
when: the gateway CCA is in the list of Responding CCA-capable nodes, said at least one node waiting for the next list of Responding CCA-capable nodes; otherwise, selecting and assigning a new gateway CCA from the list of Responding CCA-capable nodes.

54. The method of claim 51, wherein said act of determining the assignment of the gateway CCA further comprises acts of:
transmitting a vote from each Responding CCA-capable node to all other CCA-capable nodes identifying which CCA-capable node has been designated a subsequent gateway CCA; and
tallying said votes for each CCA-capable node, and
when: one CCA-capable node receives more votes than any of the other CCA-capable nodes, assigning the one CCA-capable node to become the new gateway CCA, otherwise repeating the transmitting act.

55. The method of claim 54 further comprising an act of determining if at least ⅔ of the plurality of CCA-capable nodes are active, and wherein at least ⅔ of the CCA capable nodes must respond before performing the act of transmitting the vote.

56. A cross layer communication capable node, herein referred to as CCA-capable node comprising:
a non-transitory computer readable medium; and
a data processing system executing one or more instruction blocks stored on the non-transitory computer readable medium, wherein said instruction blocks comprise:
a first transmitting and receiving instruction block for communicating with a sub-network, the CCA-capable node capable of sending data to and receiving data from nodes and a plurality of CCA-capable nodes within the sub-network; and
a determination instruction block for determining the CCA-capable node to assign as a gateway CCA, whereby
said gateway CCA is so assigned and used by the nodes within the sub-network to communicate with the rest of the network;
a designation instruction block for designating one of the plurality of CCA-capable nodes to be a gateway CCA;
a broadcast message sent from the CCA-capable node every T1 seconds to the plurality of nodes;
wherein T1 is a predetermined time period; and
a selecting instruction block for selecting a gateway CCA based upon a received active message from each CCA-capable node; wherein
the selecting instruction block comprises:
a current time determination instruction block for determining a current time at which a received active message from each other CCA-capable node was received; wherein,
the received active message is broadcasted from each other CCA-capable node to at least the CCA-capable node every T1 seconds;
a retrieving instruction block for retrieving a gateway time TLAST at which a message from the gateway CCA was received;

wherein TLAST is determined as a time when the message from the gateway CCA was received last;

designating each CCA-capable node as a Responding CCA-capable node when TLAST<(current time−2(T1)) is true for the CCA-capable node; and a selecting and assigning instruction block for selecting and assigning a new gateway CCA from the Responding CCA-capable nodes.

57. The CCA-capable node of claim 56, wherein the determination instruction block further comprises:

a designation message for designating one of the plurality of Responding CCA-capable nodes to be a gateway CCA;

a compiling instruction block for compiling a list of CCA-capable nodes;

a query message sent from the CCA-capable node for querying each CCA capable node in the list to determine its state, whereby the compiling instruction block updates the list of Responding CCA-capable nodes based on a response from each of the CCA capable nodes, and checks for a response from the gateway CCA, and when the gateway CCA responds, a second query message is sent; otherwise, a transmitting instruction block transmits the list of Responding CCA-capable nodes to the plurality of nodes in the sub-network; and a selecting and assigning instruction block in each node selects and assigns a new gateway CCA from the list of Responding CCA-capable nodes.

58. The CCA-capable node of claim 56 further comprising:

a designation instruction block for designating one of the plurality of Responding CCA-capable nodes to be a gateway CCA;

a query message sent from the CCA-capable node for querying each CCA capable node in the plurality of Responding CCA-capable nodes to determine its state;

a compiling instruction block for compiling a list of CCA-capable nodes based on a response from each of the Responding CCA-capable nodes;

a sending instruction block for sending the list of Responding CCA-capable nodes to the plurality of nodes in the sub-network; and a checking instruction block for checking the list of Responding CCA-capable nodes for the gateway CCA, whereby when the gateway CCA is in the list of Responding CCA-capable nodes the node waits for the next list of CCA-capable nodes; otherwise, a selecting and assigning instruction block in each node selects and assigns a new gateway CCA from the list of Responding CCA-capable nodes.

59. The CCA-capable node of claim 56 further comprising:

a designation instruction block for designating one of the plurality of Responding CCA-capable nodes to be a gateway CCA;

a transmitting instruction block for transmitting a vote from the CCA-capable node to all other CCA-capable nodes identifying which Responding CCA-capable node has been designated a subsequent gateway CCA; and a tallying instruction block in the CCA-capable node for tallying said votes for each Responding CCA-capable node, whereby when one Responding CCA-capable node receives more votes than any of the other CCA-capable nodes, an assigning instruction block for assigning the one Responding CCA-capable node to become the new gateway CCA, otherwise the transmitting instruction block transmits a second vote.

60. The CCA-capable node of claim 59 further comprising a determination instruction block for determining if at least ⅔ of the plurality of CCA-capable nodes are active, and wherein at least ⅔ of the CCA-capable nodes must respond before the transmitting instruction block transmits a vote.

61. A non-transitory computer-readable medium for enabling a cross layer communication capable node, herein referred to as CCA-capable node, the non-transitory computer readable medium having computer-executable instructions for causing a computer in the CCA-capable node to perform operations of:

associating a CCA-capable node with a sub-network, the CCA-capable node capable of sending and receiving data to and from nodes within the sub-network; and determining the CCA-capable node to assign as a gateway CCA, whereby said gateway CCA is used by the nodes within the sub-network to communicate with the rest of the network; wherein the act of determining the assignment of the gateway CCA further comprises acts of:

designating one of the plurality of CCA-capable nodes to be a gateway CCA;

broadcasting a message from each CCA-capable node every T1 seconds to the plurality of nodes;

wherein T1 is a predetermined time period; and selecting a new gateway CCA based upon the message from each CCA-capable node; wherein the act of selecting further comprises acts of:

determining a current time at which the message from each CCA-capable node was received;

retrieving a gateway time TLAST at which a message from the gateway CCA was received;

wherein TLAST is determined as a time when the message from the gateway CCA was received last;

designating each CCA-capable node as a Responding CCA-capable node when TLAST<(current time−2(T1)) is true for the CCA-capable node; and selecting and assigning the new gateway CCA from the Responding CCA-capable nodes.

62. The non-transitory computer-readable medium of claim 61, wherein said act of determining the assignment of the gateway CCA further comprises acts of:

compiling a list of Responding CCA-capable nodes on at least one CCA-capable node of the plurality of CCA-capable nodes;

querying each CCA-capable node, from the at least one CCA-capable node, in the list to determine the state of each CCA-capable node;

updating the list of Responding CCA-capable nodes based on a response from each of the CCA-capable nodes; and checking for a response from the gateway CCA, and when: the gateway CCA responds, repeating the querying act; otherwise, transmitting the list of Responding CCA-capable nodes to the plurality of nodes in the sub-network; and selecting and assigning a new gateway CCA from the list of Responding CCA-capable nodes.

63. The non-transitory computer-readable medium of claim 61, wherein the act of determining the assignment of the gateway CCA further comprises acts of:

querying each CCA-capable node, from at least one CCA-capable node in the plurality of CCA-capable nodes, in the plurality of CCA-capable nodes to determine the state of each CCA-capable node;

updating a list of Responding CCA-capable nodes, stored on the at least one CCA capable node, based on a response from each of the CCA-capable nodes;

sending, from the at least one CCA-capable node, the list of Responding CCA-capable nodes to the plurality of nodes in the sub-network;

waiting to repeat the querying act; and checking, by at least one node in the plurality of nodes, the list of Responding CCA capable nodes for the gateway CCA, and when: the gateway CCA is in the list of Responding CCA-capable nodes, said at least one node waiting for the next list of Responding CCA-capable nodes; otherwise, selecting and assigning a new gateway CCA from the list of Responding CCA-capable nodes.

64. The non-transitory computer-readable medium of claim 61, wherein said act of determining the assignment of the gateway CCA further comprises acts of:

transmitting a vote from each Responding CCA-capable node to all other CCA-capable nodes identifying which CCA-capable node has been designated a subsequent gateway CCA; and tallying said votes for each CCA-capable node, and when: one CCA-capable node receives more votes than any of the other CCA capable nodes, assigning the one CCA-capable node to become the new gateway CCA, otherwise repeating the transmitting act.

65. The non-transitory computer-readable medium of claim 64 further comprising an act of determining if at least $2/3$ of the plurality of CCA-capable nodes are active, and wherein at least $2/3$ of the CCA-capable nodes must respond before performing the act of transmitting the vote.

* * * * *